US008203510B2

(12) United States Patent
Yamamoto et al.

(10) Patent No.: US 8,203,510 B2
(45) Date of Patent: Jun. 19, 2012

(54) DISPLAY APPARATUS, DRIVING METHOD FOR DISPLAY APPARATUS AND ELECTRONIC APPARATUS

(75) Inventors: Tetsuro Yamamoto, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 756 days.

(21) Appl. No.: 12/318,935

(22) Filed: Jan. 13, 2009

(65) Prior Publication Data

US 2009/0195527 A1 Aug. 6, 2009

(30) Foreign Application Priority Data

Feb. 4, 2008 (JP) ................................ P2008-024052

(51) Int. Cl.
*G09G 3/30* (2006.01)
*G09G 3/36* (2006.01)
*G09G 5/00* (2006.01)
*G06F 3/038* (2006.01)

(52) U.S. Cl. ........... 345/76; 345/204; 345/103; 345/211

(58) Field of Classification Search .................. 345/204, 345/211, 213, 76, 87, 98–100, 103
See application file for complete search history.

(56) References Cited

U.S. PATENT DOCUMENTS

| | | | | |
|---|---|---|---|---|
| 6,313,818 | B1 | 11/2001 | Kondo et al. | |
| 7,248,237 | B2 * | 7/2007 | Yamada et al. ................. | 345/76 |
| 2005/0206590 | A1 | 9/2005 | Sasaki et al. | |
| 2007/0285359 | A1 | 12/2007 | Ono | |

FOREIGN PATENT DOCUMENTS

| | | | |
|---|---|---|---|
| EP | 0 905 673 | A1 | 3/1999 |
| JP | 2003-255856 | A | 9/2003 |
| JP | 2003-271095 | A | 9/2003 |
| JP | 2004-029791 | A | 1/2004 |
| JP | 2004-093682 | A | 3/2004 |
| JP | 2004-133240 | A | 4/2004 |
| JP | 2007-133284 | A | 5/2007 |
| JP | 2007-148128 | | 6/2007 |
| JP | 2007-156460 | A | 6/2007 |
| JP | 2007-171828 | A | 7/2007 |
| JP | 2007-304225 | A | 11/2007 |

OTHER PUBLICATIONS

Austrian Search Report dated Sep. 14, 2009 for corresponding SG Application No. 200900782-4.
Extended European Search Report issued Apr. 21, 2009 for corresponding European Application 09 25 0206.

* cited by examiner

*Primary Examiner* — Bipin Shalwala
*Assistant Examiner* — Ilana Spar
(74) *Attorney, Agent, or Firm* — Rader, Fishman & Grauer, PLLC

(57) ABSTRACT

A display apparatus, including: a pixel array section; and a driving section; the pixel array section including a plurality of scanning lines disposed along the direction of a row, a plurality of signal lines disposed along the direction of a column, a plurality of pixels disposed in rows and columns at places at which the scanning lines and the signal lines intersect with each other, and a plurality of feed lines disposed in parallel to the scanning lines; the driving section including a scanner for successively supplying a control signal to the scanning lines with a phase difference of a horizontal period, a selector for supplying an image signal having a signal potential, which changes over between a reference potential and a signal potential within each horizontal period, to the signal lines, and a power supply for supplying a power supply voltage, which changes over between a high potential and a low potential within each horizontal period, to the feed lines.

19 Claims, 19 Drawing Sheets

DISPLAY APPARATUS, DRIVING METHOD FOR DISPLAY APPARATUS AND ELECTRONIC APPARATUS

The present invention contains subject matter related to Japanese Patent Application JP 2008-024052 filed with the Japan Patent Office on Feb. 4, 2008, the entire contents of which being incorporated herein by reference.

BACKGROUND OF THE INVENTION

1. Field of the Invention

This invention relates to a display apparatus of the active matrix type wherein a light emitting element is used in a pixel and a driving method for a display apparatus of the type described. The present invention relates also to an electronic apparatus which includes a display apparatus of the type described.

2. Description of the Related Art

In recent years, development of a display apparatus of the planar self-luminous type which uses an organic EL (electroluminescence) device as a light emitting element is proceeding energetically. The organic EL device utilizes a phenomenon that, if an electric field is applied to an organic thin film, then the organic thin film emits light. Since the organic EL device is driven by an application voltage lower than 10 V, the power consumption of the same is low. Further, since the organic EL device is a self-luminous device which itself emits light, it requires no illuminating member and can be formed as a device of a reduced weight and a reduced thickness. Further, since the response speed of the organic EL device is approximately several μs and very high, an after-image upon display of a dynamic picture does not appear.

Among display apparatus of the flat self-luminous type wherein an organic EL device is used in a pixel, a display apparatus of the active matrix type wherein thin film transistors as active elements are formed in an integrated relationship in pixels is being developed energetically. A flat self-luminous display apparatus of the active matrix type is disclosed, for example, in Japanese Patent Laid-open Nos. 2003-255856, 2003-271095, 2004-133240, 2004-029791 and 2004-093682.

FIG. 16 schematically shows an example of an existing active matrix display apparatus. Referring to FIG. 16, the display apparatus shown includes a pixel array section 1 and a peripheral driving section. The driving section includes a horizontal selector 3 and a write scanner 4. The pixel array section 1 includes a plurality of signal lines SL extending along the direction of a column and a plurality of scanning lines WS extending along the direction of a row. A pixel 2 is disposed at a place at which each of the signal lines SL and each of the scanning lines WS intersect with each other. In order to facilitate understandings, only one pixel 2 is shown in FIG. 16. The write scanner 4 includes a shift register which operates in response to a clock signal ck supplied thereto from the outside to successively transfer a start pulse sp supplied thereto similarly from the outside to output a sequential control signal to the scanning line WS. The horizontal selector 3 supplies an image signal to the signal line SL in synchronism with the line sequential scanning of the write scanner 4 side.

The pixel 2 includes a sampling transistor T1, a driving transistor T2, a storage capacitor C1 and a light emitting element EL. The driving transistor T2 is of the P-channel type, and is connected at a source thereof, which is one of current terminals, to a power supply line and at the drain thereof, which is the other current terminal, to the light emitting element EL. The driving transistor T2 is connected at the gate thereof, which is a control terminal thereof, to the signal line SL through the sampling transistor T1. The sampling transistor T1 is rendered conducting in response to a control signal supplied thereto from the write scanner 4 and samples and writes an image signal supplied from the signal line SL into the storage capacitor C1. The driving transistor T2 receives, at the gate thereof, the image signal written in the storage capacitor C1 as a gate voltage Vgs and supplies drain current Ids to the light emitting element EL. Consequently, the light emitting element EL emits light with luminance corresponding to the image signal. The gate voltage Vgs represents a potential at the gate with reference to the source.

The driving transistor T2 operates in a saturation region, and the relationship between the gate voltage Vgs and the drain current Ids is represented by the following characteristic expression:

$$Ids=(1/2)\mu(W/L)Cox(Vgs-Vth)^2$$

where μ is the mobility of the driving transistor, W the channel width of the driving transistor, L the channel length of the driving transistor, Cox the gate insulating layer capacitance per unit area of the driving transistor, and Vth is the threshold voltage of the driving transistor. As can be apparently seen from the characteristic expression, when the driving transistor T2 operates in a saturation region, it functions as a constant current source which supplies the drain current Ids in response to the gate voltage Vgs.

FIG. 17 illustrates a voltage/current characteristic of the light emitting element EL. In FIG. 17, the axis of abscissa indicates the anode voltage V and the axis of ordinate indicates the drain current Ids. It is to be noted that the anode voltage of the light emitting element EL is the drain voltage of the driving transistor T2. The current/voltage characteristic of the light emitting element EL varies with time such that the characteristic curve thereof tends to become less steep as time passes. Therefore, even if the drain current Ids is fixed, the anode voltage or drain voltage V varies. In this regard, since the driving transistor T2 in the pixel circuit 2 shown in FIG. 16 operates in a saturation region and can supply drain current Ids corresponding to the gate voltage Vgs irrespective of the variation of the drain voltage, the emission light luminance can be kept fixed irrespective of the time-dependent variation of the characteristic of the light emitting element EL.

FIG. 18 shows another example of an existing pixel circuit. Referring to FIG. 18, the pixel circuit shown is different from that described hereinabove with reference to FIG. 16 in that the driving transistor T2 is not of the P-channel type but of the N-channel type. From a fabrication process of a circuit, it is frequently advantageous to form all transistors which compose a pixel from N-channel transistors.

SUMMARY OF THE INVENTION

However, in the circuit configuration of FIG. 18, since the driving transistor T2 is of the N-channel type, it is connected at the drain thereof to a power supply line and at the source S thereof to the anode of the light emitting element EL. Accordingly, if a characteristic of the light emitting element EL changes as time passes, an influence of this appears on the potential of the source S. Consequently, the gate voltage Vgs varies and the drain current Ids supplied to the driving transistor T2 varies as time passes. Therefore, the luminance of the light emitting element EL varies as time passes. Further, not only the light emitting element EL, but also the threshold voltage Vth of the driving transistor T2 disperses for each pixel. Since the threshold voltage Vth is included in the transistor characteristic expression given hereinabove, even if the gate voltage Vgs is fixed, the drain current Ids varies. Consequently, the emission light luminance varies for each pixel, resulting in failure in achievement of the uniformity of the screen image. In related art, a display apparatus has been disclosed which has a function of correcting the threshold voltage Vth of the driving transistor T2 which disperses for each pixel, that is, a threshold voltage correction function, and is disclosed, for example, in Japanese Patent Laid-open No. 2004-133240 mentioned hereinabove.

If the threshold voltage correction function is incorporated in each pixel, then the circuit configuration of the pixel is complicated and also the number of component elements increases. As transistors, one, two or more switching transistors are required in addition to a sampling transistor and a driving transistor.

In order to incorporate the threshold voltage correction function into each pixel without increasing the number of component transistors of the pixel, a power supply scanner which scans a power supply voltage in a unit of a row is required in addition to a write scanner for scanning lines. However, different from the write scanner which merely outputs a gate pulse, it is necessary for the power supply scanner to supply driving current to the power supply lines, and therefore, the output buffers of the power supply scanner have a large device size. Thus, it is necessary for the power supply scanner to include, in addition to a shift register for carrying out line-sequential scanning similarly to the write scanner, an output buffer of a large size for each stage of the shift register for supplying high current. Such a power supply scanner or drive scanner as just described not only occupies a large peripheral area of a display panel but also requires a high fabrication cost, making a subject to be solved.

Therefore, it is desirable to provide a display apparatus which incorporates a threshold voltage correction function for each pixel without scanning a power supply voltage.

According to an embodiment of the present invention, there is provided a display apparatus including a pixel array section, and a driving section. The pixel array section including a disposed along the direction of a row, a plurality of signal lines disposed along the direction of a column, a plurality of pixels disposed in rows and columns at places at which the scanning lines and the signal lines intersect with each other, and a plurality of feed lines disposed in parallel to the scanning lines. The driving section including a scanner for successively supplying a control signal to the scanning lines with a phase difference of a horizontal period, a selector for supplying an image signal having a signal potential, which changes over between a reference potential and a signal potential within each horizontal period, to the signal lines, and a power supply for supplying a power supply voltage, which changes over between a high potential and a low potential within each horizontal period, to the feed lines. Each of the pixels including a sampling transistor connected at one of a pair of current terminals thereof to an associated one of the signal lines and at a control terminal thereof to an associated one of the scanning lines, a driving transistor connected at one of a pair of current terminals thereof, which serves as a drain side, to an associated one of the feed lines and at a control terminal thereof, which serves as a gate, to the other one of the current terminals of the sampling transistor, a light emitting element connected to that one of the current terminals of the driving transistor which serves as a source Side, and a storage capacitor connected between the source and the gate of the driving transistor. The sampling transistor being turned on, when the associated feed line has the low potential and the associated signal line has the reference potential, in response to the control signal to carry out a preparation operation of setting the gate of the driving transistor to the reference potential and setting the source of the driving transistor to the low potential. The sampling transistor carrying out a correction operation of writing a threshold voltage of the driving transistor into the storage capacitor connected between the gate and the source of the driving transistor within a period after the potential of the associated feed line changes over from the low potential to the high potential after the preparation operation is carried out until the sampling transistor is turned off in response to the control signal. The sampling transistor being turned on in response to the control signal when the associated feed line has the high potential and the associated signal line has the signal potential to write the signal potential into the storage capacitor. The driving transistor supplying driving current corresponding to the signal potential written in the storage capacitor to the light emitting element to carry out a light emitting operation.

Preferably, the selector changes over the image signal among three levels including a stop potential lower than the reference potential in addition to the reference potential and the signal potential within each horizontal period, and the sampling transistor repetitively carries out the correction operation time-divisionally and separately within a plurality of horizontal periods and applies, in each of the correction operations, the stop potential to the gate of the driving transistor after the application of the reference potential to stop the correction operation.

In this instance, the stop potential may be different from the low potential by a voltage lower than the threshold voltage of the driving transistor. Or, the sampling transistor may apply, after the preparation operation, the stop potential to the gate of the driving potential to turn off the driving transistor.

Preferably, the scanner turns off, after the writing operation, the sampling transistor to start the light emitting operation and then turns on the sampling transistor to write a predetermined potential from the associated signal line to the gate of the driving transistor to stop the emission of light of the light emitting element. Further preferably, the light emitting element is connected at the anode thereof to the source of the driving transistor and at the cathode thereof to a predetermined cathode potential, and the predetermined potential is lower than the sum of the threshold voltage of the light emitting element and the threshold voltage of the driving transistor to the cathode potential. More preferably, the selector supplies the reference potential as the predetermined potential to the signal lines.

In the display apparatus, the driving section uses a simple pulse power supply in place of a power supply scanner in the existing display apparatus. In order to carry out a threshold voltage correction operation, the power supply scanner in the existing display apparatus scans the feed lines line-sequentially. In contrast, in the display apparatus of the embodiment of the present invention, the power supply voltage which changes over between the high potential and the low potential within a horizontal period is applied commonly to the feed lines. This implements a threshold voltage correction function for each of the pixels. Since the pulse power supply does not need any line-sequentially scan the feed lines, it can be formed in a simple configuration and in a small device size. Accordingly, the pulse power supply can be incorporated readily in a panel of the display apparatus, which is advantageous not only in yield but also in cost.

DETAILED DESCRIPTION OF THE PREFERRED EMBODIMENT

Figure 1:
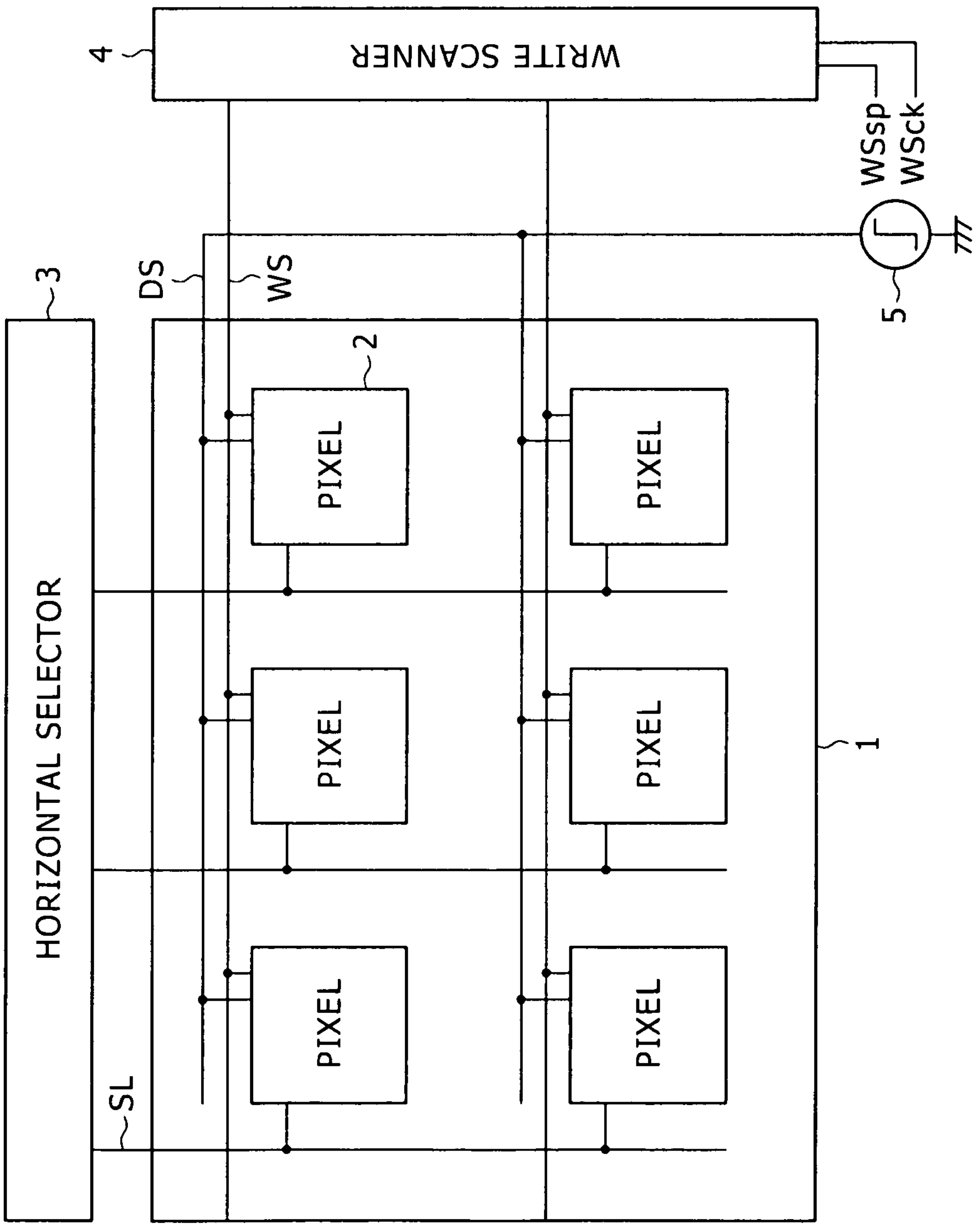
FIG. 1 is a block diagram showing a general configuration of a display apparatus to which the embodiment of the present invention is applied.

The preferred embodiment of the present invention will now be described in reference to the accompanying drawings. Referring to FIG. 1, there is shown a general configuration of a display apparatus to which the embodiment of the present invention is applied. The display apparatus includes a pixel array section 1 and a driving section. Preferably the pixel array section 1 and the driving section disposed around the pixel array section are formed in an integrated manner on a single panel such that a flat display unit is formed. The pixel array section 1 includes a plurality of scanning lines WS extending along the direction of a row, a plurality of signal lines SL extending along the direction of a column, a plurality of pixels 2 disposed in rows and columns at places at which the scanning lines WS and the signal lines SL intersect with each other, and a plurality of feed lines DS disposed in parallel to the scanning lines WS. Meanwhile, the driving section includes a write scanner 4 for successively supplying a control signal to the scanning lines WS with a phase difference of a horizontal period, a horizontal selector 3 for supplying an image signal which is changed over between a reference potential and a signal potential appear within each one horizontal period, and a power supply 5 for supplying a power supply voltage which is changed over between a high potential and a low potential within each one horizontal period commonly to the feed lines DS.

The write scanner 4 includes a shift register in order to successively supply the control signal to the scanning lines WS extending along the direction of a row. The shift register which operates in response to a clock signal WSck supplied thereto from the outside to successively transfer a start pulse WSsp supplied thereto similarly from the outside to output a sequential control signal to the scanning line WS. In contrast, the pulse power supply 5 has a simple power structure. The pulse power supply 5 supplying the power supply voltage which changes over between the high potential and the low potential within a horizontal period is applied commonly to the feed lines.

Figure 2:
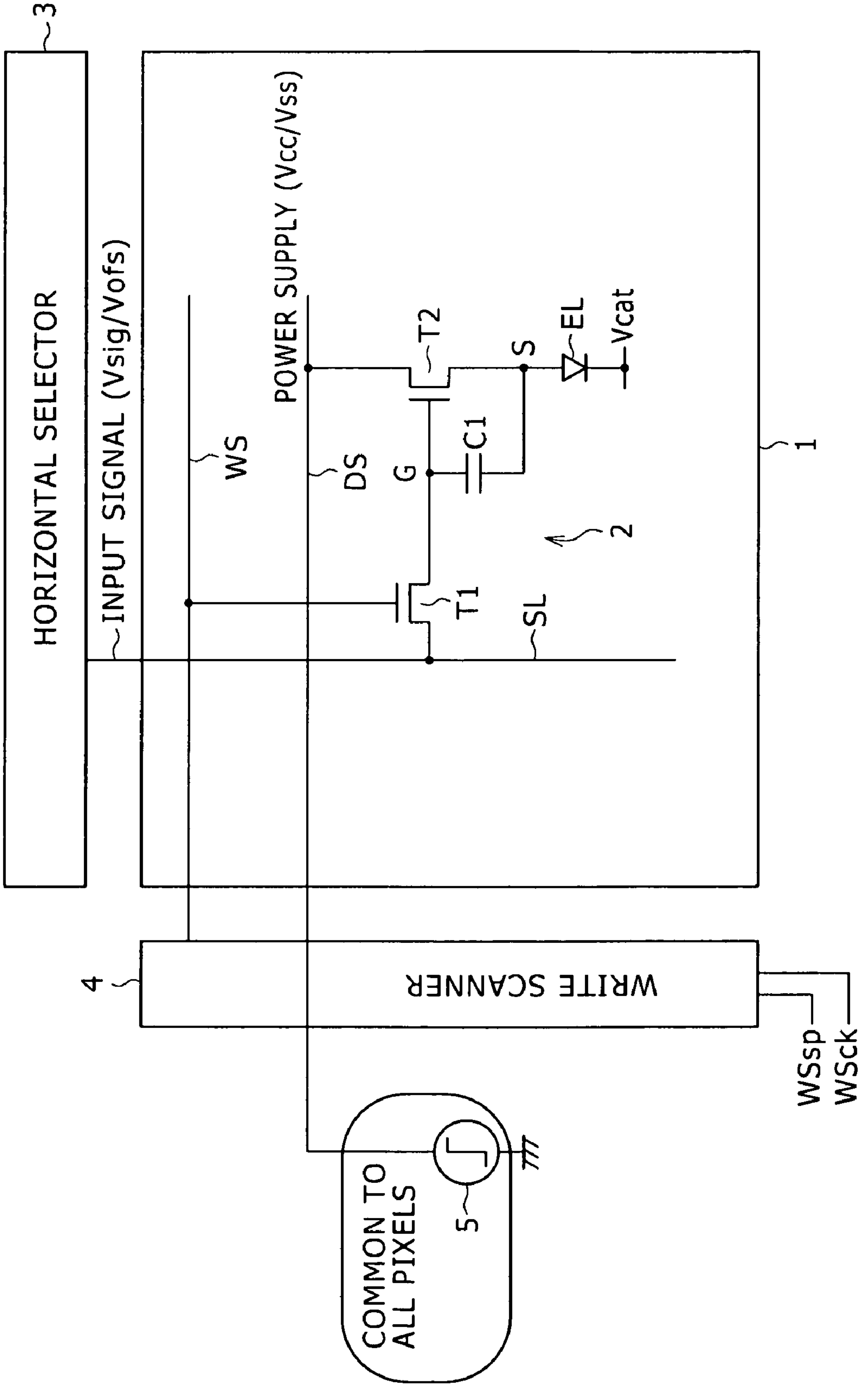
FIG. 2 is a circuit diagram showing a configuration of a pixel incorporated in the display apparatus shown in FIG. 1.

FIG. 2 shows a particular configuration of the pixels 2 shown in FIG. 1. Referring to FIG. 2, each pixel 2 includes a sampling transistor T1 connected at one of current terminals thereof to an associated signal line SL and at a control terminal thereof to an associated scanning line WS and a driving transistor T2 connected at one of current terminals, which serves as the drain side, to an associated feed line DS and at a control terminal thereof, which serves as the gate G, to the other current terminal of the sampling transistor T1. The pixel 2 further includes a light emitting element EL connected to one of the current terminals of the driving transistor T2, which serves as the source S side, and a storage capacitor C1 connected between the source S and the gate G of the driving transistor T2. It is to be noted that the light emitting element EL is of the diode type and is connected at the anode thereof to the source S of the driving transistor T2 and at the cathode thereof to a cathode potential Vcat.

When the feed line DS has the low potential Vss and the signal line SL has the reference potential Vofs, the sampling transistor T1 is turned on in response to the control signal to carry out a preparation operation of setting the gate G of the driving transistor T2 to the reference potential Vofs and setting the source S of the driving transistor T2 to the low potential Vss. Then, within a period after the potential of the feed line DS changes over from the low potential Vss to the high potential Vcc until the sampling transistor T1 is turned off in response to the control signal, the sampling transistor T1 carries out a correction operation of writing the threshold voltage Vth of the driving transistor T2 into the storage capacitor C1 connected between the gate G and the source S of the driving transistor T2. Thereafter, when the feed line DS has the high potential Vcc and the signal line SL has the signal potential Vsig, the sampling transistor T1 is turned on in response to the control signal to carry out a writing operation of writing the signal potential Vsig into the storage capacitor C1. The driving transistor T2 supplies driving current Ids corresponding to the signal potential Vsig written in the storage capacitor C1 to the light emitting element EL to carry out a light emitting operation.

In one form, the selector 3 changes over the image signal among three levels including a stop potential Vini lower than the reference potential Vofs in addition to the reference potential Vofs and the signal potential Vsig within each horizontal period. In this instance, the sampling transistor T1 repetitively carries out the correction operation time-divisionally and separately within a plurality of horizontal periods. In each of the correction operations, the sampling transistor T1 applies the stop potential Vini to the gate G of the driving transistor T2 to stop the correction operation after the application of the reference potential Vofs. The stop potential Vini is set such that the difference thereof from the low potential Vss is lower than the threshold voltage Vth of the driving transistor T2. Preferably, the sampling transistor T1 applies the stop potential Vini to the gate G of the driving transistor T2 to turn off the driving transistor T2 after the preparation operation.

In another form, after the scanner 4 turns off, after the writing operation, the sampling transistor T1 to start a light emitting operation, it turns on the sampling transistor T1 to write the predetermined potential from the signal line SL to the gate G of the driving transistor T2 to turn off the light emitting element EL. This predetermined potential is lower than the sum potential of the threshold voltage Vthel of the light emitting element EL and the threshold voltage Vth of the pixel 2 to the cathode potential Vcat. Preferably, the selector 3 supplies the reference potential Vofs as the predetermined potential to the signal line SL.

Figure 3:
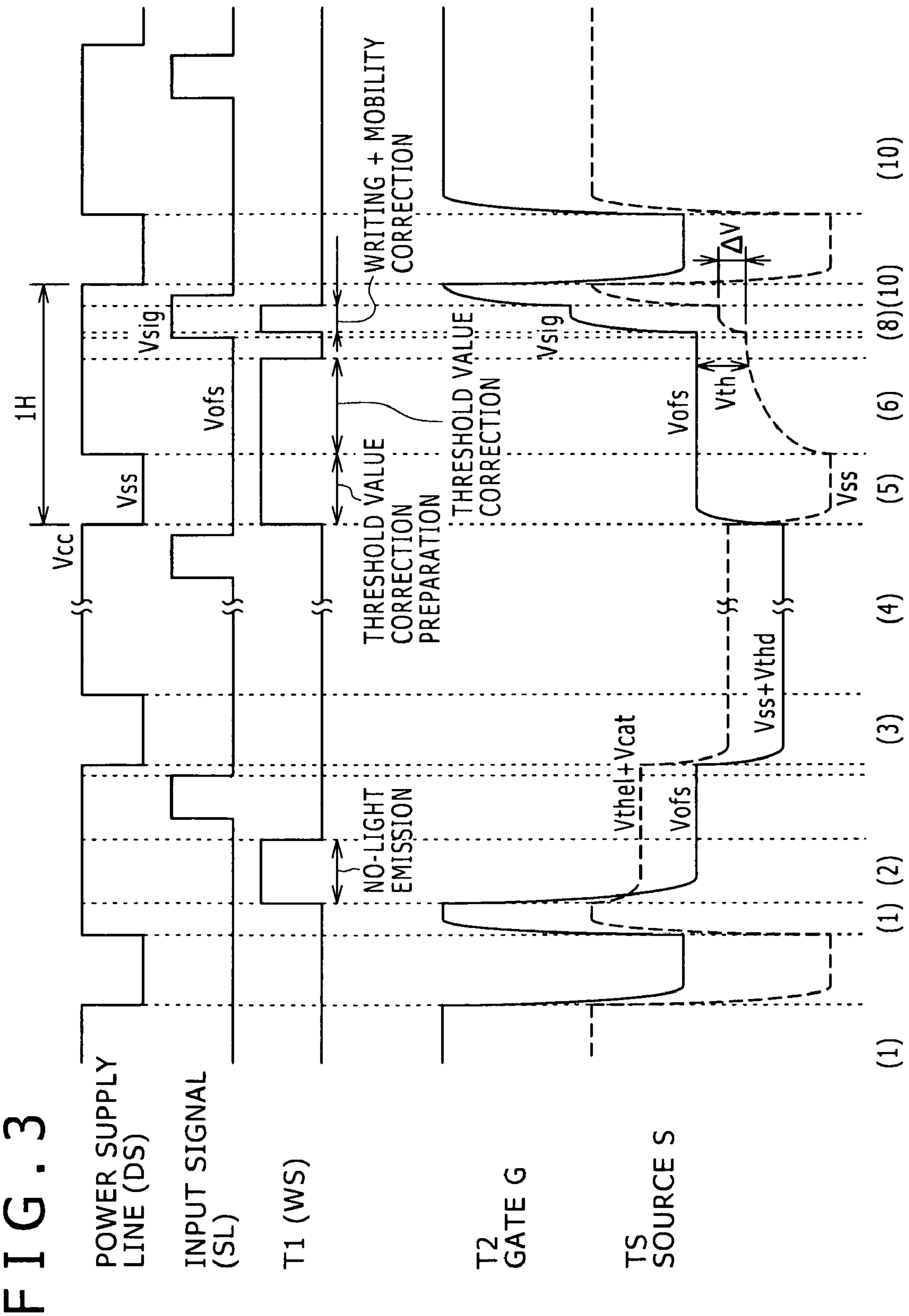
FIG. 3 is a timing chart illustrating operation of the display apparatus shown in FIGS. 1 and 2.

FIG. 3 illustrates operation of the display apparatus shown in FIGS. 1 and 2. More particularly, FIG. 3 illustrates a potential variation of the feed line or power supply line DS, a potential variation of the image signal or input signal inputted to the signal line SL, a potential variation of the gate control signal for the sampling transistor T1 supplied to the scanning line WS, a potential variation of the gate G of the driving transistor T2 and a potential variation of the source S of the driving transistor T2 on the same time axis.

Referring to FIG. 3, the power supply line (DS) exhibits changeover between the low potential Vss and the high potential Vcc within one horizontal period (1 H). The input signal (SL) exhibits changeover between the reference potential Vofs and the signal potential Vsig within 1 H. The control signal (WS) includes three pulses such that the sampling transistor T1 repeats on and off three times within a sequence of operations. Within the period, the gate-source voltage Vgs of the driving transistor T2 exhibits such a variation as seen in FIG. 3. The sequence of operations is divided into periods (1) to (10). The periods include a light emitting period (1), a no-light emitting period (2), a preparation period (5), a correction period (6), a writing period (8) and a light emitting period (10).

Figure 4A:
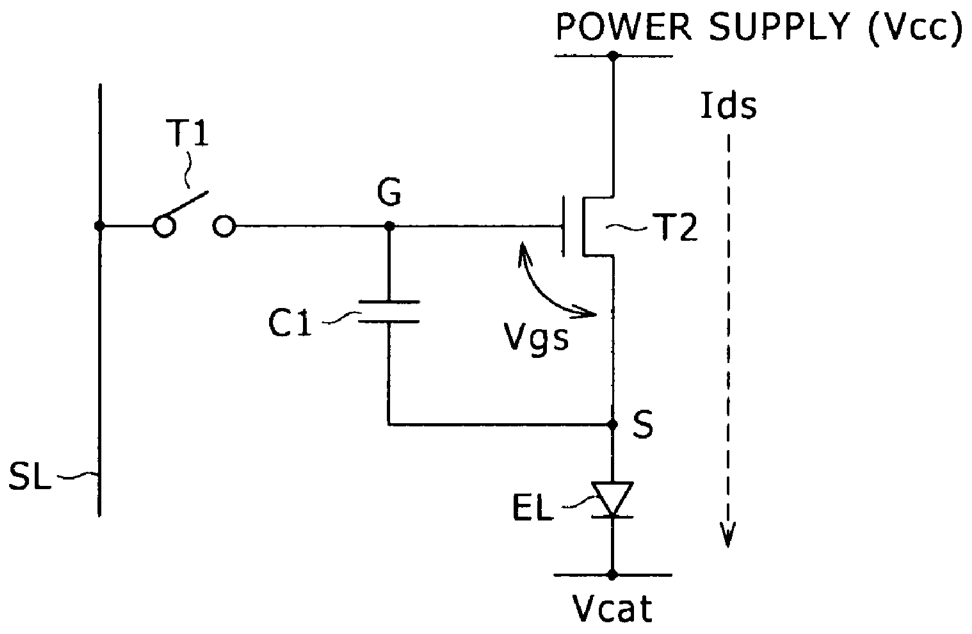
FIGS. 4A to 4F are circuit diagrams illustrating operations of the pixel shown in FIG. 2.

In the following, the operations of the display apparatus shown in FIGS. 1 to 3 are described in detail with reference to FIGS. 4A to 4J. FIG. 4A illustrates an operation state of a pixel within the light emitting period (1) illustrated in FIG. 3. First, in the light emitting state of the light emitting element EL, the sampling transistor T1 is in an off state as seen in FIG. 4A. At this time, since the power supply assumes the values of the high potential Vcc and the low potential Vss with in 1 H as described hereinabove, the light emitting element EL repeats emission of light and no-emission of light at a high speed. Accordingly, it visually looks as if light were emitted continuously. Since the driving transistor T2 operates, upon light emission, in a saturation region, the current Ids flowing to the light emitting element EL assumes a value indicated by the transistor characteristic expression given hereinabove in response to the gate-source voltage Vgs of the driving transistor T2.

Figure 4B:
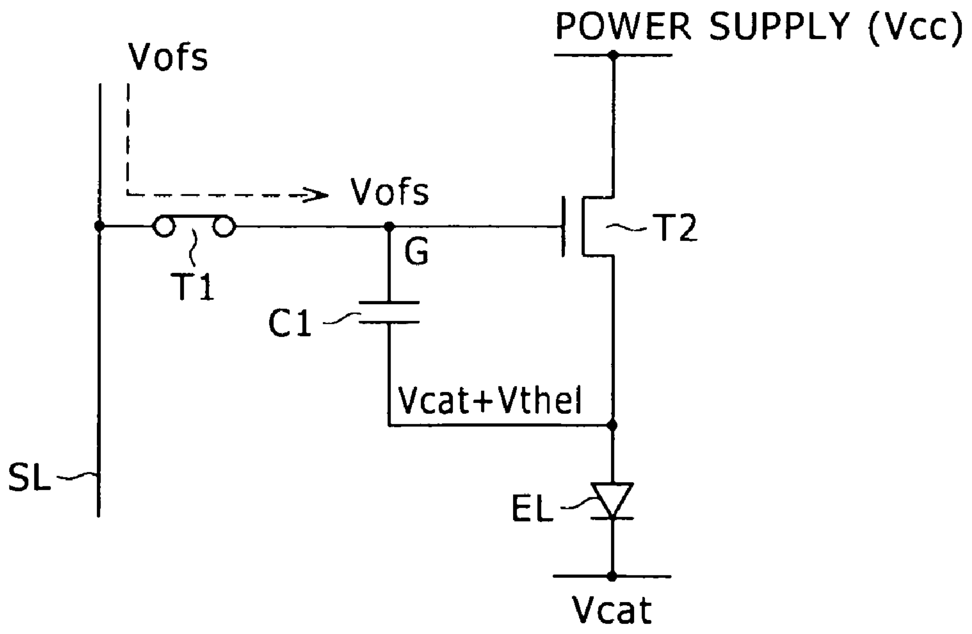

FIG. 4B illustrates an operation state of the pixel within the no-light emitting period (2). Within the no-light emitting period of the light emitting element EL, when the feed line DS has the high potential Vcc and the potential of the signal line SL is the reference potential Vofs, the sampling transistor T1 is turned on to input the reference potential Vofs to the gate of the driving transistor T2. At this time, as the reference potential Vofs is inputted, a coupling in accordance with the capacitance is inputted to the source of the driving transistor T2. Here, if the gate-source voltage Vgs of the driving transistor T2 is lower than the threshold voltage Vth of the driving transistor T2, then the light emitting element EL emits no light. If the source voltage of the driving transistor T2 by the coupling, that is, the anode voltage of the light emitting element EL, is lower than the sum of the threshold voltage Vthel and the cathode voltage Vcat of the light emitting element EL, then the voltage is maintained. On the contrary, if the source voltage of the driving transistor T2 is equal to or higher than the sum Vthel+Vcat, then the light emitting element EL discharges until the potential becomes equal to the sum Vthel+Vcat. It is described here particularly that the anode voltage of the light emitting element EL becomes equal to Vthel+Vcat. Here, the reference potential Vofs may particularly be lower than Vcat+Vthel+Vth which is the sum of the cathode voltage Vcat, the threshold voltage Vthel of the light emitting element EL and the threshold voltage Vth of the driving transistor T2.

Figure 4C:
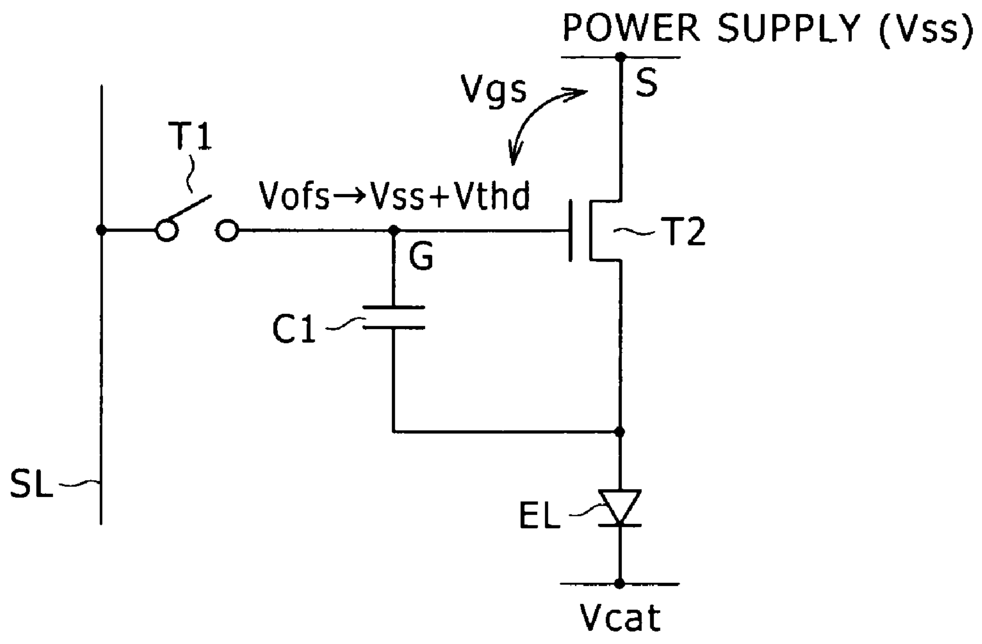

FIG. 4C illustrates a state of the pixel within the period (3). The sampling transistor T1 is turned off to change over the power supply voltage from the high potential Vcc to the low potential Vss. It is necessary for the low potential Vss to be a voltage which satisfies Vofs−Vss>Vth in order that a threshold value correction operation to be carried out later may be carried out normally. Therefore, the feed line DS becomes the source of the driving transistor T2 and the anode voltage of the light emitting element EL drops. Here, since the sampling transistor T1 is in an off state, as the anode voltage of the light emitting element EL drops, also the gate potential of the sampling transistor T1 drops. When the gate voltage finally becomes equal to Vss+Vthd, the driving transistor T2 is cut off. Vthd here is a threshold voltage between the gate of the driving transistor T2 and the power supply. Further, the voltage between the gate of the driving transistor T2 and the anode of the light emitting element EL is lower than the threshold voltage Vthd.

Figure 4D:
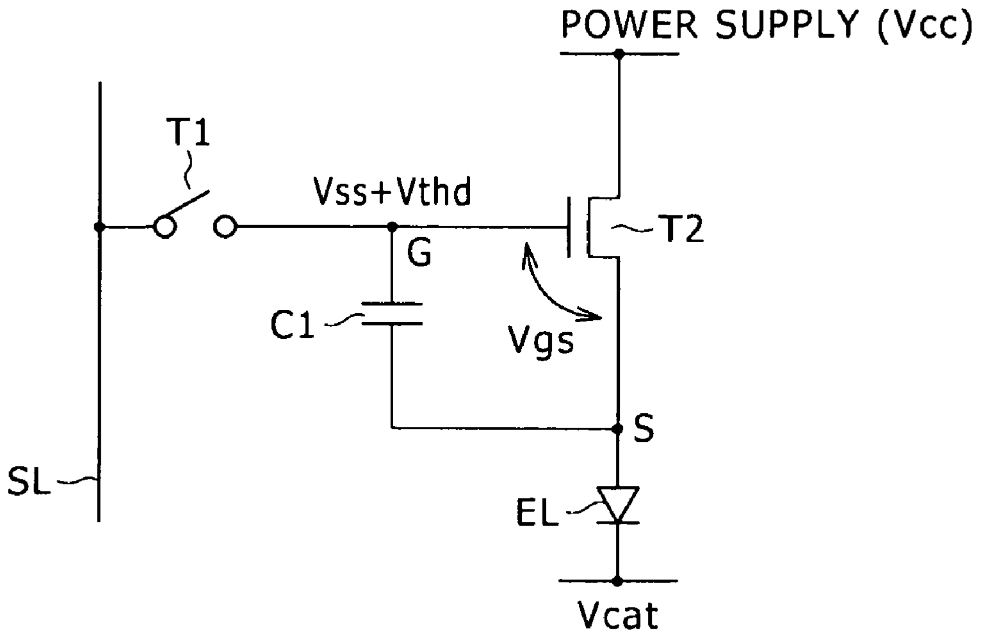

FIG. 4D illustrates a state of the pixel within the period (4). Although the power supply becomes the high potential Vcc after lapse of a fixed period of time, since the voltage between the gate of the driving transistor T2 and the anode of the light emitting element EL is lower than the threshold voltage as described hereinabove, the driving transistor T2 remains in the cut off state.

Figure 4E:
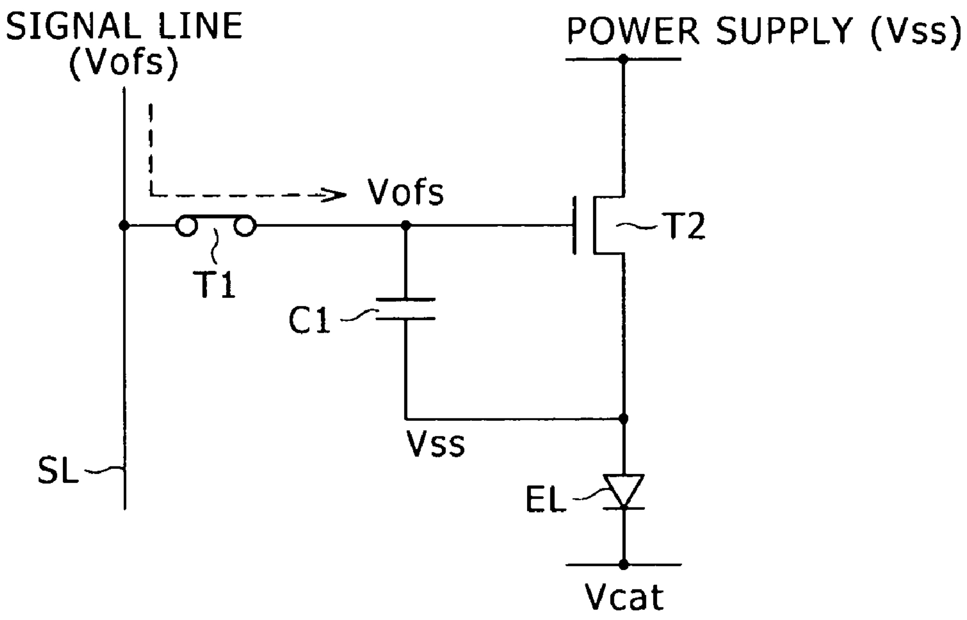

FIG. 4E illustrates an operation state of the pixel within the threshold value correction period (5). When the power supply voltage is the low potential Vss and the image signal has the reference potential Vofs within the threshold value correction preparation period, the sampling transistor T1 is turned on to input the reference potential Vofs to the driving transistor T2 and input the low potential Vss to the anode of the light emitting element EL, that is, to the source of the driving transistor T2.

Figure 4F:
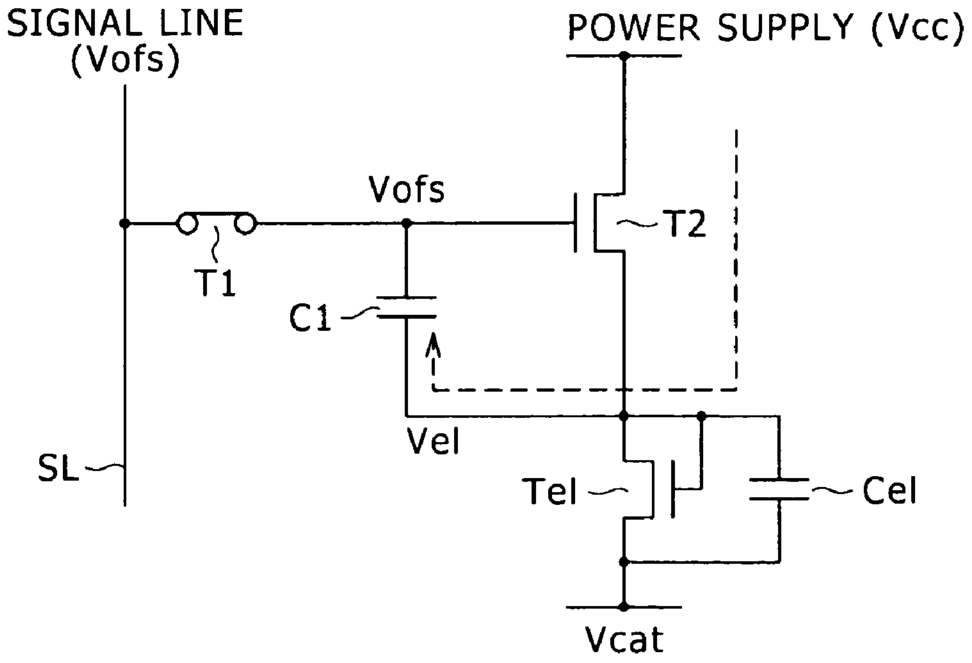
Figure 4G:
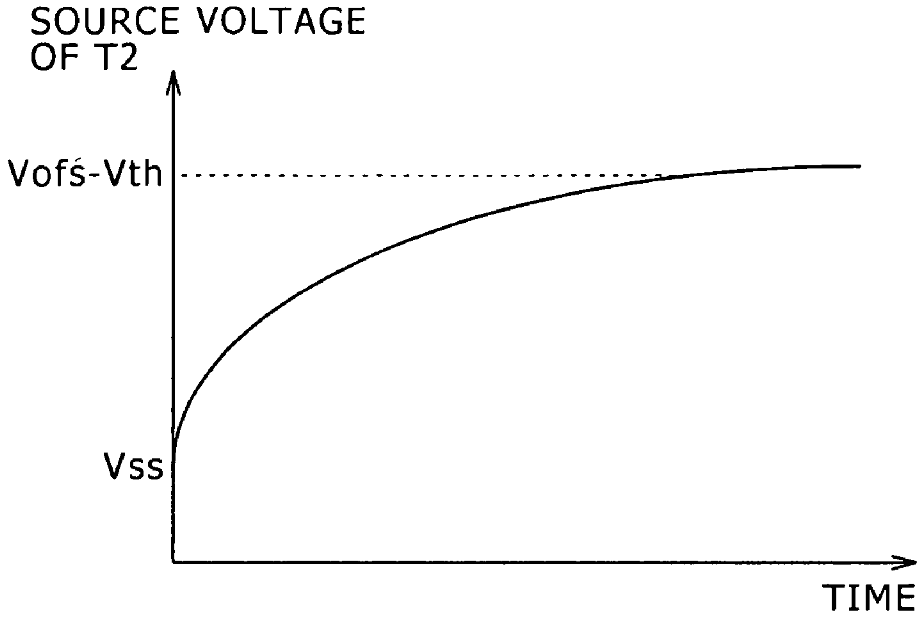
FIG. 4G is a graph illustrating the operation illustrated in FIG. 7.
Figure 4H:
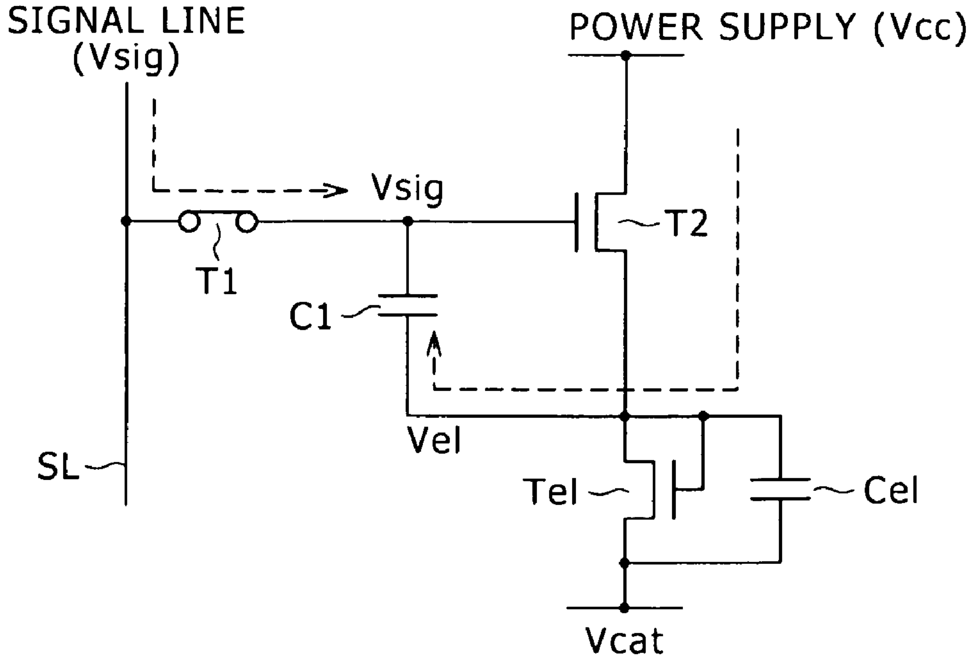
FIG. 4H is a circuit diagram illustrating an operation of the pixel shown in FIG. 2.

FIG. 4F illustrates an operation state of the pixel within the threshold voltage correction period (6). Within the threshold value correction period, the power supply voltage is set to the high potential Vcc again. At this time, current flows as seen in FIG. 4F. Since the equivalent circuit of the light emitting element EL is represented by a diode Tel and a capacitor Cel as seen in FIG. 4F, if Vel≦Vcat+Vthel is satisfied, that is, if leak current of the light emitting element EL is considerably lower than the current flowing through the driving transistor T2, then the current of the driving transistor T2 is used to charge the storage capacitor C1 and the capacitor Cel. At this time, the anode potential Vel of the driving transistor T2 rises as time passes as seen in FIG. 4G. After lapse of a fixed period of time, the gate-source voltage of the driving transistor T2 becomes equal to the threshold voltage Vth. Thereafter, the sampling transistor T1 is turned off to end the threshold value correction operation. At this time, Vel=Vofs−Vth≦Vcat+Vthel is satisfied.

Figure 4I:
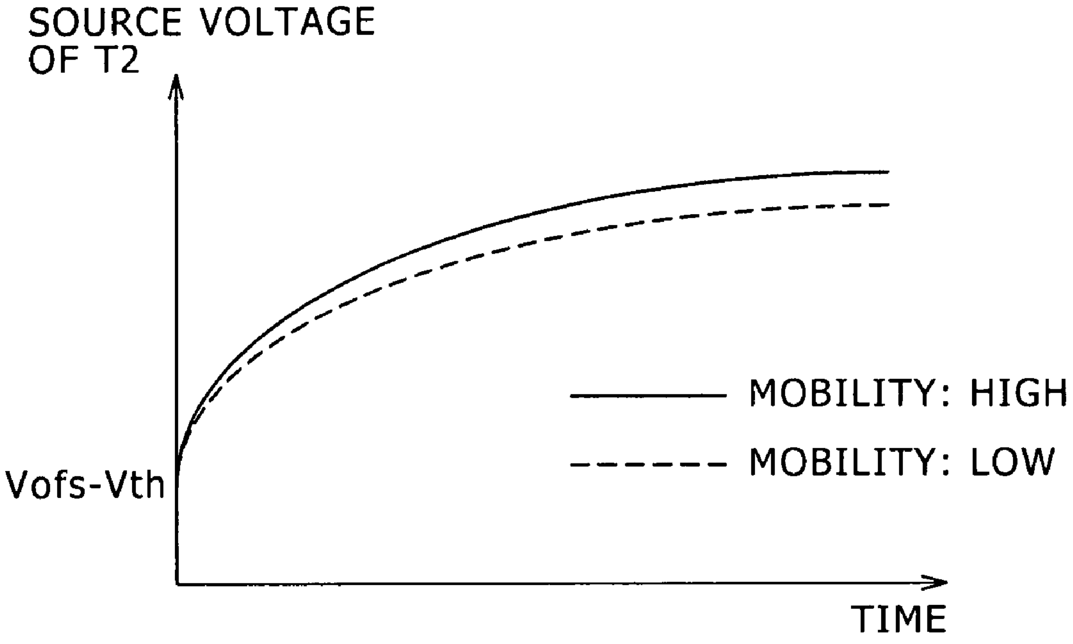
FIG. 4I is a graph illustrating the operation illustrated in FIG. 4H.

FIG. 4I illustrates an operation state of the pixel within the writing period (8). When the signal line potential becomes the signal potential Vsig, the sampling transistor T1 is turned on again. The signal potential Vsig is representative of a gradation. Although the gate potential of the driving transistor T2 becomes the signal potential Vsig because the sampling transistor T1 is in an on state, since current from the power supply flows through the driving transistor T2, the source potential of the driving transistor T2 rises as time passes. At this time, if the source voltage of the driving transistor T2 does not exceed the sum of the threshold voltage Vthel and the cathode voltage Vcat of the light emitting element EL, that is, if the leak current of the light emitting element EL is considerably lower than the current flowing through the driving transistor T2, then the current of the driving transistor T2 is used to charge the storage capacitor C1 and the capacitor Cel. At this time, since the threshold value correction operation of the driving transistor T2 is completed already, the current flowing through the driving transistor T2 reflects the mobility μ. More particularly, where the mobility is high, the current amount then is great and also the rise ΔV of the source voltage is fast. On the contrary where the mobility is low, the current amount is small and the rise ΔV of the source voltage is slow as seen in FIG. 4I. Consequently, the gate-source voltage of the driving transistor T2 decreases reflecting the mobility and fully becomes equal to the gate-source voltage Vgs for correcting the mobility after a fixed period of time.

Figure 4J:
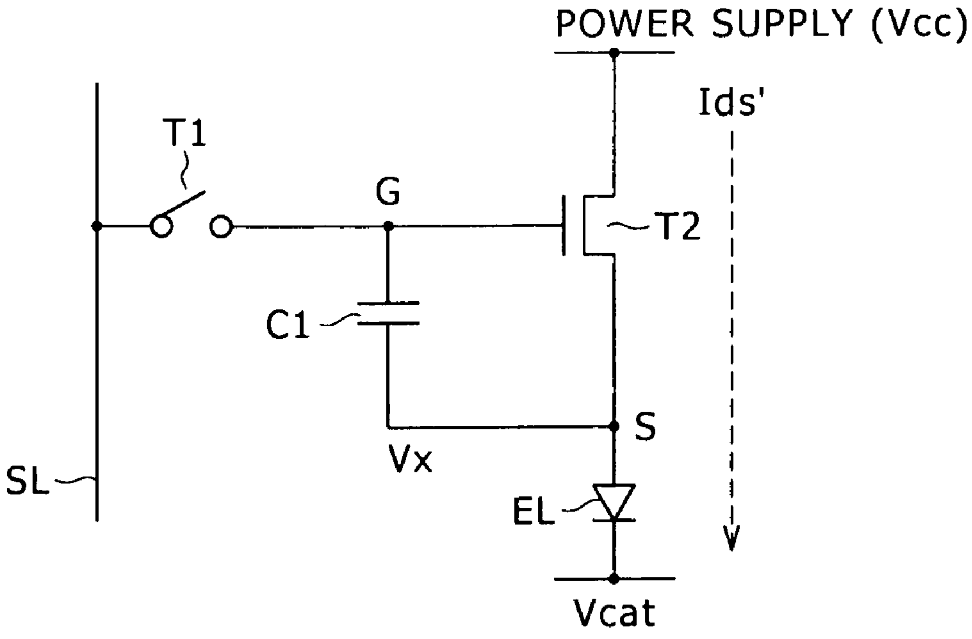
FIG. 4J is a circuit diagram illustrating an operation of the pixel shown in FIG. 2.

FIG. 4J illustrates an operation state of the pixel within the light emitting period (10). The sampling transistor T1 is turned off to end the writing and cause the light emitting element EL to emit light. Since the gate-source voltage of the driving transistor T2 is fixed, the driving transistor T2 supplies fixed current Ids' to the light emitting element EL, and thereupon, the anode potential Vel rises to a voltage Vx at which the fixed current Ids' flows to the light emitting element EL so that the light emitting element EL emits light. After lapse of a fixed period of time, the power supply voltages changes from the high potential Vcc to the low potential Vss and then back to the high potential Vcc. However, since the gate-source voltage of the driving transistor T2 is fixed, when the power supply voltage is the high potential Vcc, the light emitting element EL emits light while keeping the state upon signal writing. Also in the present circuit, as the light emitting time becomes long, the I-V characteristic of the light emitting element EL varies. Therefore, also the potential at the point S in FIG. 4J varies. However, since the gate-source voltage of the driving transistor T2 is kept at the fixed value, the current flowing through the light emitting element EL does not vary. Therefore, even if the I-V characteristic of the light emitting element EL deteriorates, the fixed driving current Ids continues to flow and the luminance of the light emitting element EL does not vary.

Figure 5:
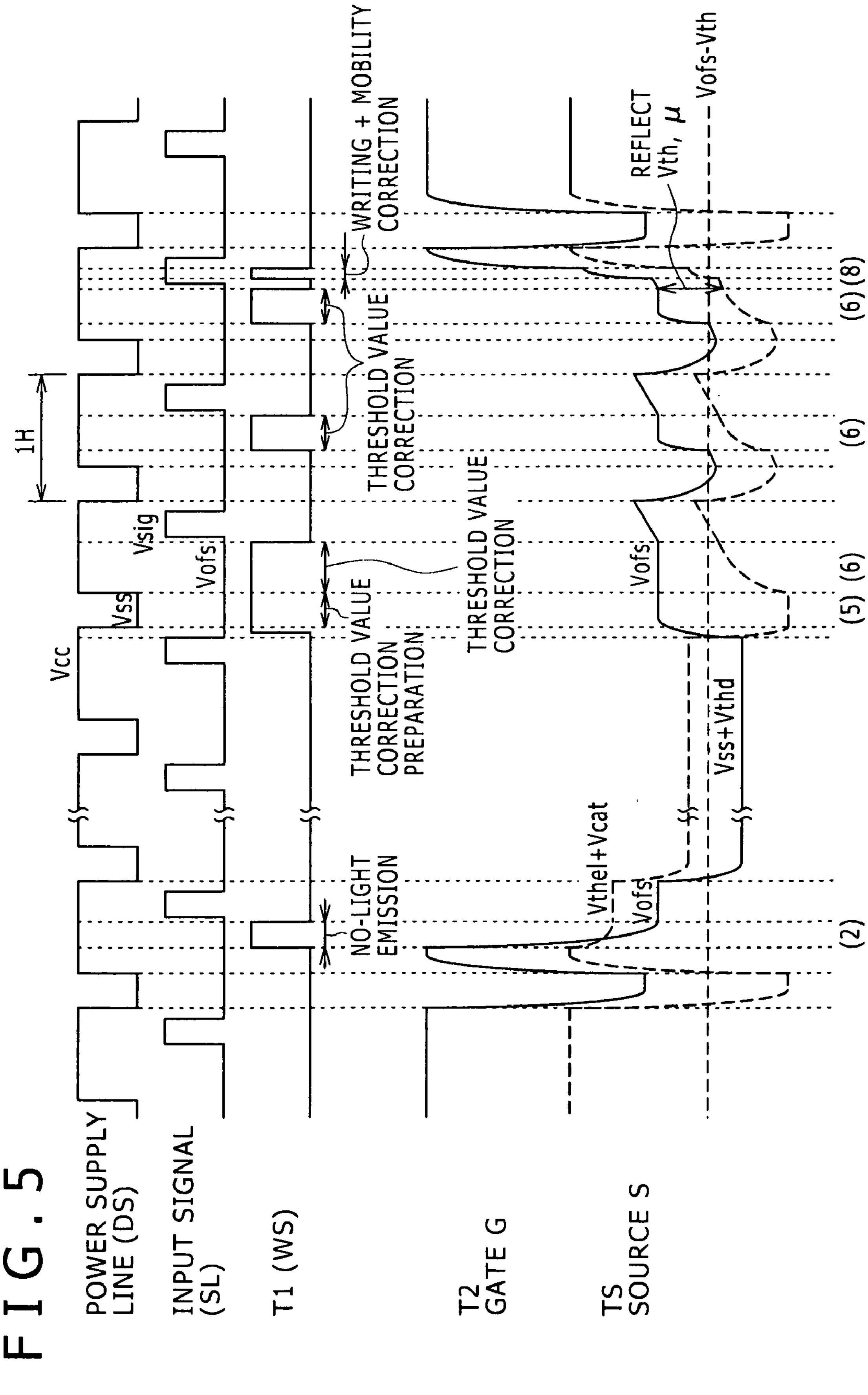
FIGS. 5 to 8 are timing charts illustrating different operation sequences of the display apparatus shown in FIGS. 1 and 2.

Incidentally, in the operation sequence illustrated in FIG. 3, the threshold voltage correction operation is carried out only once within 1 H. As the definition and the operation speed of the display panel increase, the time of 1 H, that is, one horizontal period, becomes shorter. Therefore, it becomes difficult to complete the threshold voltage correction operation within one horizontal period. Therefore, it becomes necessary to repetitively and time-divisionally carry out the threshold voltage correction operation over a plurality of horizontal periods. FIG. 5 illustrates such a time-divisional operation sequence as just described. Referring to FIG. 5, the threshold value correction period (6) is repeated three times after the threshold value correction preparation period (5).

The timing chart of FIG. 5 illustrates also a variation of the gate potential and the source potential of the driving transistor T2 corresponding to the threshold value correction operation (6) repeated three times. If the divisional threshold voltage correction operation is carried out in accordance with the operation sequence illustrated in FIG. 5 using the pixel circuit configuration shown in FIG. 2, then the source voltage of the driving transistor T2 does not become fully equal to the threshold voltage Vth, but a divisional correction operation with a potential with which the rise amount of the source potential of the driving transistor T2 within the threshold value correction period (6) when the feed line DS has the high potential Vcc and the drop amount of the source potential of the driving transistor T2 within the threshold value correction period when the feed line DS is the low potential Vss coincide with each other is repeated. Therefore, after the divisional correction operation comes to an end, the gate-source voltage Vgs of the driving transistor T2 does not necessarily reflect the threshold voltage Vth of the driving transistor T2 fully, but there is the possibility that such picture quality inferiority as unevenness or stripes appears upon display of a low gradation.

Figure 6:
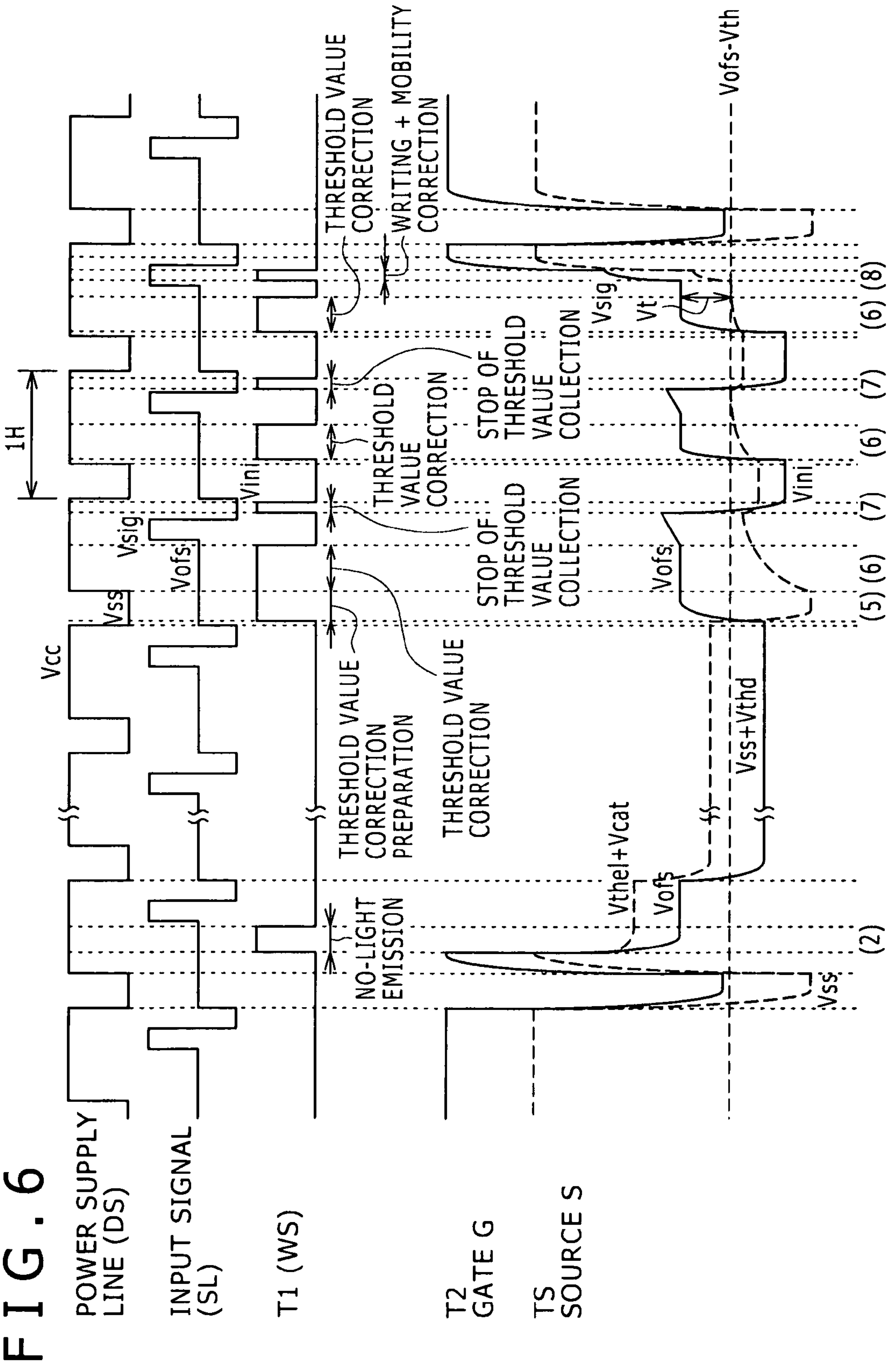

FIG. 6 illustrates a time-divisional correction method which eliminates the defect of the operation sequence illustrated in FIG. 5. In order to facilitate understandings, a representation manner similar to that of the timing chart shown in FIG. 5 is adopted. The present operation sequence is characterized in that the input signal or image signal supplied to the signal line SL assumes a stop voltage Vini lower than the reference voltage Vofs in addition to the reference voltage Vofs and the signal potential Vsig within a period of 1 H. In the example illustrated in FIG. 6, the stop voltage Vini is outputted to the signal line SL subsequently to the signal potential Vsig, and all of the signal potential Vsig, stop potential Vini and reference voltage Vofs are outputted when at least the feed line DS has the high potential Vcc. The stop potential Vini included in the image signal is used to introduce the threshold value correction stopping mechanism (7) between adjacent ones of the divisional threshold value correction periods (6).

In the following, the sequence of the divisional threshold voltage correction operation is described in detail. The light emitting element EL carries out a light emitting operation and a no-light emitting operation similarly as in the case of the timing chart illustrated in FIG. 5. In the present operation sequence, when the signal line SL has the reference potential Vofs within the no-light emitting period (2), the sampling transistor T1 is turned on to turn off the light emitting element EL, the turning off of the light emitting element EL need not necessarily be carried out in this manner. In particular, when the signal line SL has the stop potential Vini, the sampling transistor T1 may be turned on to turn off the light emitting element EL.

After lapse of a fixed period of time after the threshold value correction operation (5) is started, the sampling transistor T1 is turned off. By this operation, the reference potential Vofs and the low potential Vss are inputted to the gate and the source of the driving transistor T2. Here, the condition of Vofs−Vss>Vth must be satisfied as described hereinabove. Thereafter, the power supply voltage is changed to the high potential Vcc to start a threshold value correction operation.

After lapse of a fixed period of time after the threshold value correction operation is started, the sampling transistor T1 is turned off. At this time, since the gate-source voltage Vgs of the driving transistor T2 is higher than the threshold voltage Vth, current flows from the power supply. Consequently, the gate and source voltages of the driving transistor T2 rise. At this time, in order to carry out the threshold value correction operation normally, it is necessary for the source potential to be lower than the sum of the threshold voltage and the cathode voltage of the light emitting element EL such that the gate-source voltage Vgs of the driving transistor T2 when the sampling transistor T1 is turned on again after the lapse of the fixed period of time to input the reference potential Vofs to the gate of the driving transistor T2 is higher than the threshold voltage.

After lapse of a fixed period of time, the potential of the signal line SL is set to the stop potential Vini to turn on the sampling transistor T1 to input the stop potential Vini to the gate of the driving transistor T2. At this time, it is necessary that Vini−Vss be lower than the threshold voltage Vthd between the gate of the driving transistor T2 and the feed line DS and besides the gate-anode voltage of the driving transistor T2 be lower than the threshold voltage Vth.

After the stop potential Vini is inputted to the gate of the driving transistor T2, the sampling transistor T1 is turned off to set the power supply potential to the low potential Vss and the signal line potential to the reference potential Vofs. Since Vini−Vss is lower than the threshold voltage between the gate of the driving transistor T2 and the power supply, little current flows and the gate and source potentials are maintained.

Thereafter, the power supply potential is changed over from the low potential Vss to the high potential Vcc to turn on the sampling transistor T1 again to resume the threshold value correction operation. By repeating the sequence of operations, the gate-source voltage of the driving transistor T2 finally assumes the value of the threshold voltage Vth. At this time, the anode voltage of the light emitting element EL is Vofs−Vth≦Vcat+Vthel.

When the signal line potential finally becomes the signal potential Vsig, the sampling transistor T1 is turned on again to carry out signal writing and mobility correction at the same time. Then, after lapse of a fixed period of time, the sampling transistor T1 is turned off to end the writing and cause the light emitting element EL to emit light. Although the feed line DS assumes the values of the high potential Vcc and the low potential Vss within one horizontal period, since the gate-source voltage of the driving transistor T2 is fixed, when the power supply voltage is the high potential Vcc, the light emitting element EL emits light while maintaining the state upon signal writing.

Also in the present circuit, if the light emitting time becomes long, then the I-V characteristic of the light emitting element EL varies. However, since the gate-source voltage of the driving transistor T2 is kept fixed, the current flowing through the light emitting element EL does not vary. Therefore, even if the I-V characteristic of the light emitting element EL deteriorates, the driving current Ids continues to flow and the luminance of the light emitting element EL does not vary. In the present embodiment, since current flows to the driving transistor T2 after threshold value correction, a threshold value correction operation can be carried out rapidly.

Figure 7:
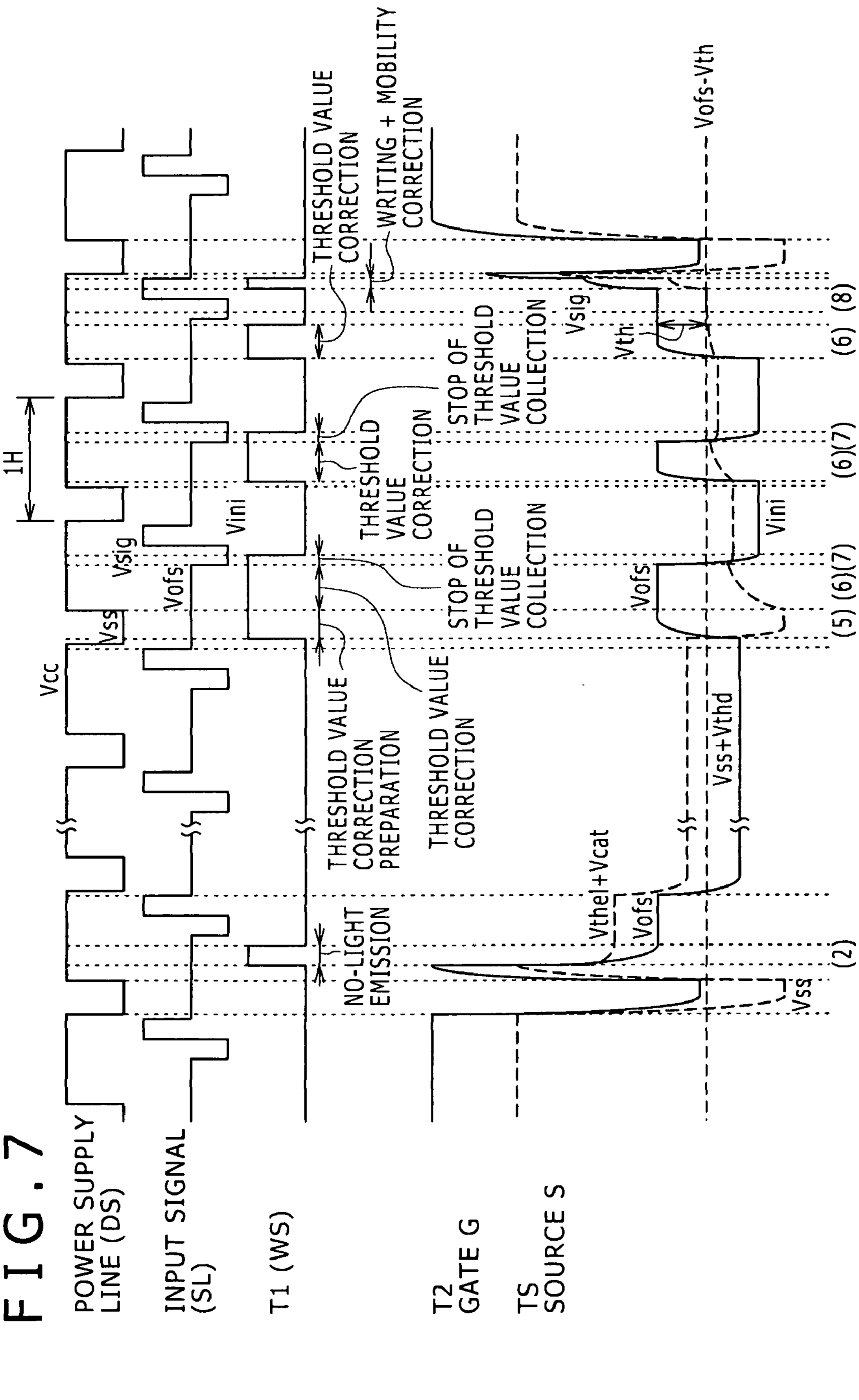

FIG. 7 illustrates a different operation sequence of the display apparatus according to the embodiment. In order to facilitate understandings, a representation manner similar to that of the timing chart shown in FIG. 6 is adopted. While, in the operation sequence illustrated in FIG. 6, the signal outputting order is Vofs→Vsig→Vini, in the operation sequence illustrated in FIG. 7, the signal outputting order is Vofs→Vini→Vsig. Also in the present operation sequence, all of the signal potential Vsig, stop potential Vini and reference potential Vofs are outputted at least when the power supply voltage is the high potential Vcc. In the present operation sequence, potential setting is carried out such that, when a threshold value correction operation comes to an end, the stop potential Vini is inputted to the gate of the driving transistor T2 so that the anode potential of the light emitting element EL may not vary when the power supply voltage is the low potential Vss.

Figure 8:
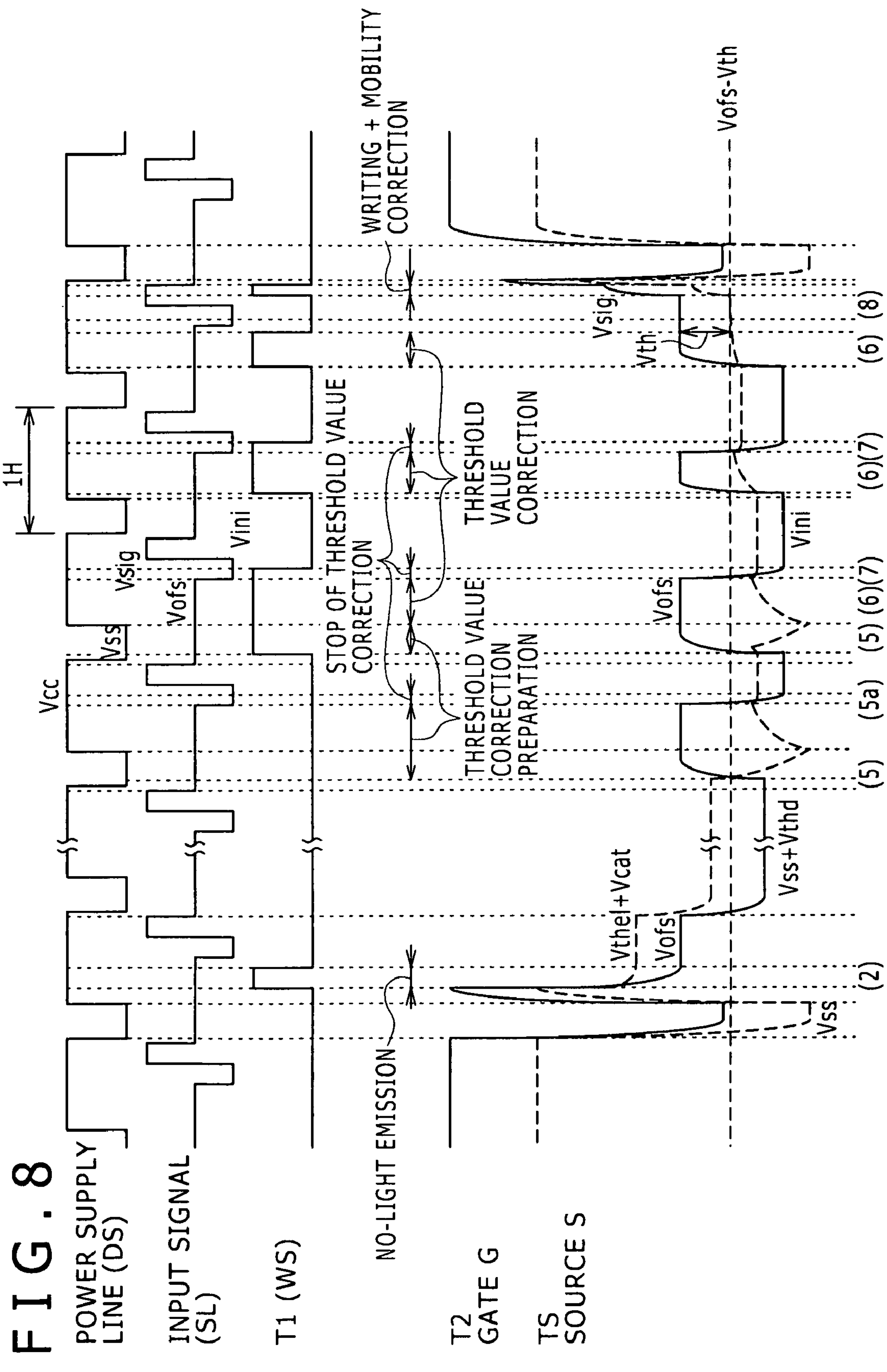

FIG. 8 illustrates another different operation sequence of the display apparatus of the embodiment. In the operation sequence of FIG. 8, against a possible case wherein the anode potential of the light emitting element EL cannot be charged up to the low potential Vss within one horizontal period, also the threshold value correction preparation period (5) is provided divisionally. In the following, the threshold value correction preparation operation of the operation sequence is described.

First, at the beginning of the threshold value correction preparation period (5), the sampling transistor T1 is turned on when the signal line is the reference potential Vofs. As a result of the turning on of the sampling transistor T1, the gate voltage of the driving transistor T2 becomes the reference potential Vofs and the source voltage of the driving transistor T2 begins to drop toward the low potential Vss. After lapse of a fixed period of time, since the power supply changes to the high potential Vcc, if the sampling transistor T1 is turned off at this time, then there is the possibility that the light emitting element EL may emit light. Therefore, the sampling transistor T1 is continued to be in the on state, and is then turned off after the potential of the signal line becomes the stop potential Vini and the stop potential Vini is inputted to the gate of the driving transistor T2. This is a correction preparation stopping period (5*a*). After the sampling transistor T1 is turned off, the power supply voltage is changed from the high potential Vcc to the low potential Vss such that the sampling transistor T1 is turned on again when the potential of the signal line is the reference potential Vofs. By repeating this sequence of operations, the source voltage of the driving transistor T2 repeats the operation described above with a potential with which the rise amount of the high potential Vcc and the drop amount of the low potential Vss coincide with each other.

Here, that the source potential of the driving transistor T2 rises when the feed line DS has the high potential Vcc signifies that current flows through the driving transistor T2. In other words, since the gate-source voltage Vgs of the driving transistor T2 is higher than the threshold voltage Vth, it is considered that the threshold value correction preparation operation is carried out normally. Therefore, the threshold value correction operation can be carried out normally.

According to the embodiment of the present invention, the feed line DS can be used commonly in the panel, and reduction of the cost of the panel can be achieved. Further, by inputting the stop potential Vini to the gate of the driving transistor T2 before the power supply becomes the low potential Vss, the divisional threshold value correction operation can be carried out normally, and such picture quality inferiority as unevenness or stripes does not appear.

According to the embodiment of the present invention, since the threshold value correction preparation period can be divided, the gate-source voltage of the driving transistor T2 can be set higher than the threshold voltage of the driving transistor T2 within the threshold value correction preparation period. Consequently, enhancement of the operation speed and the definition can be implemented.

Figure 9:
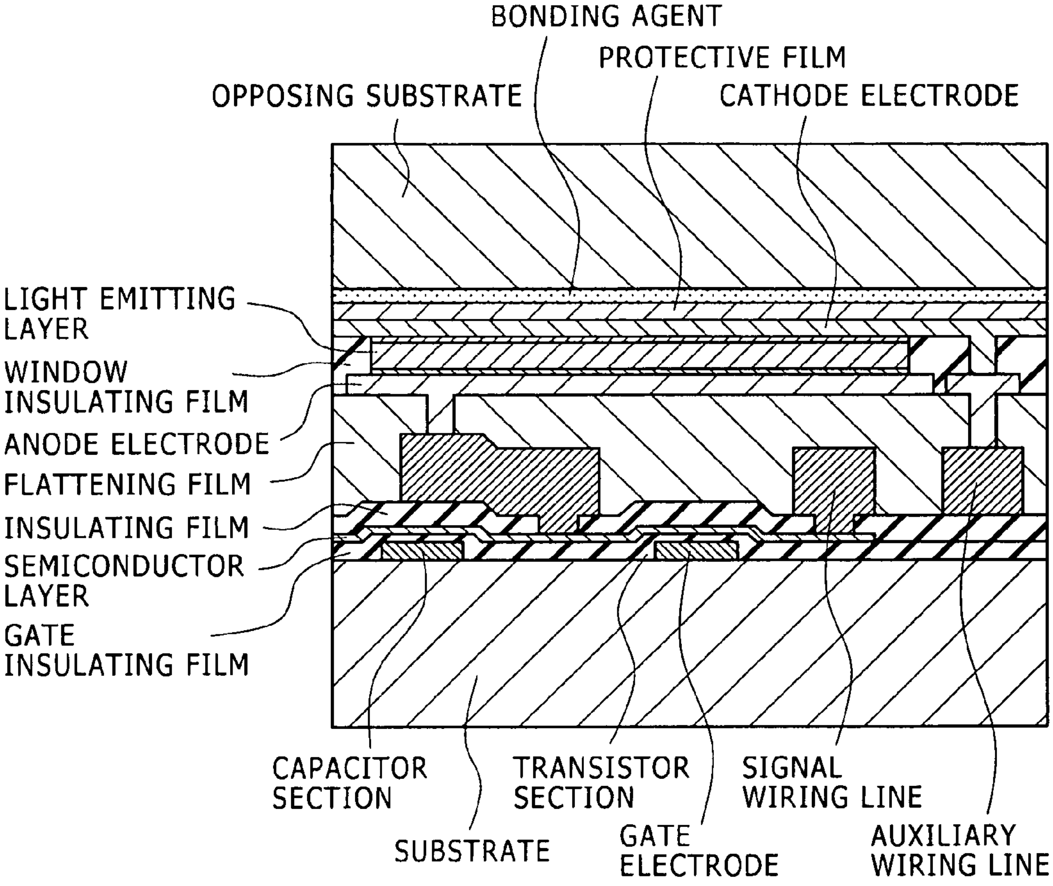
FIG. 9 is a sectional view showing a configuration of the display apparatus of FIG. 1.

The display apparatus according to the embodiment of the present invention has such a thin film device configuration as shown in FIG. 9. FIG. 9 shows a schematic sectional structure of a pixel formed on an insulating substrate. As seen in FIG. 9, the pixel shown includes a transistor section (in FIG. 9, one TFT is illustrated) including a plurality of thin film transistors, a capacitor section such as a storage capacitor or the like, and a light emitting section such as an organic EL element.

The transistor section and the capacitor section are formed on the substrate by a TFT process, and the light emitting section such as an organic EL element is laminated on the transistor section and the capacitor section. A transparent opposing substrate is adhered to the light emitting section by a bonding agent to form a flat panel.

Figure 10:
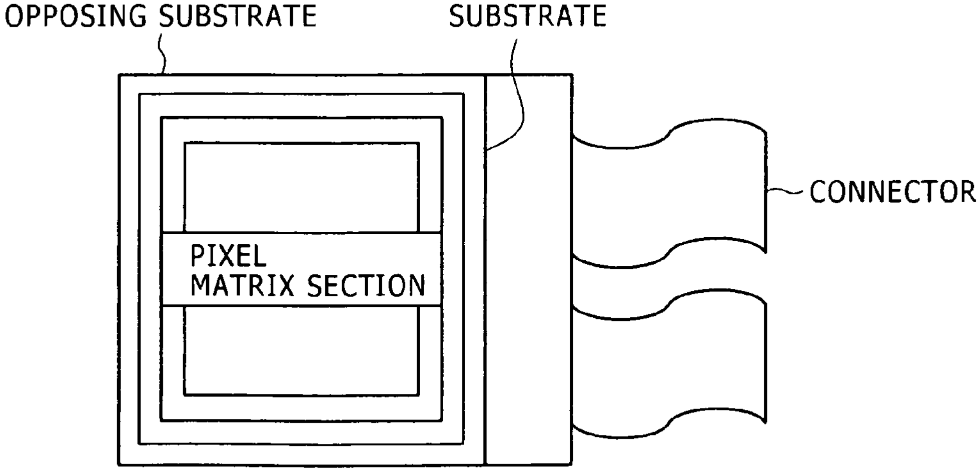
FIG. 10 is a plan view showing a module configuration of the display apparatus of FIG. 1.

The display apparatus of the present embodiment includes such a display apparatus of a module type of a flat shape as seen in FIG. 10. Referring to FIG. 10, a display array section wherein a plurality of pixels each including an organic EL element, a thin film transistor, a thin film capacitor and so forth are formed and integrated in a matrix, for example, on an insulating substrate. A bonding agent is disposed in such a manner as to surround the pixel array section or pixel matrix section, and an opposing substrate of glass or the like is adhered to form a display module. As occasion demands, a color filter, a protective film, a light intercepting film and so forth may be provided on this transparent opposing substrate. As a connector for inputting and outputting signals and so forth from the outside to the pixel array section and vice versa, for example, a flexible printed circuit (FPC) may be provided on the display module.

The display apparatus according to the embodiment of the present invention described above has a form of a flat panel and can be applied as a display apparatus of various electric apparatus in various fields wherein an image signal inputted to or produced in the electronic apparatus is displayed as an image, such as, for example, digital cameras, notebook type personal computers, portable telephone sets and video cameras. In the following, examples of the electronic apparatus to which the display apparatus is applied are described.

Figure 11:
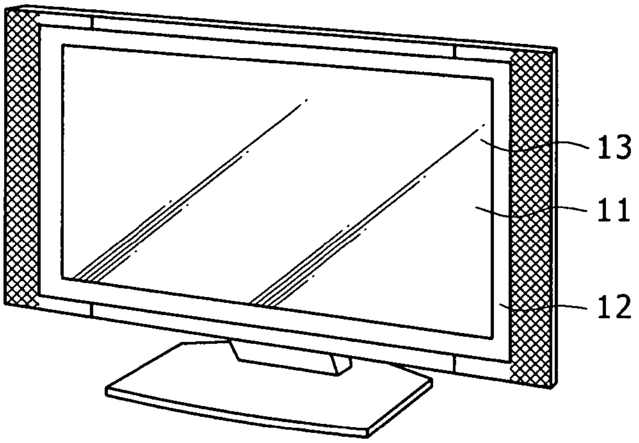
FIG. 11 is a perspective view showing a television set which includes the display apparatus of FIG. 1.

FIG. 11 shows a television set to which the embodiment of the present invention is applied. Referring to FIG. 11, the television set includes a front panel 12, an image display screen 11 formed from a filter glass plate 3 and so forth and is produced using the display apparatus of the embodiment as the image display screen 11.

Figure 12:
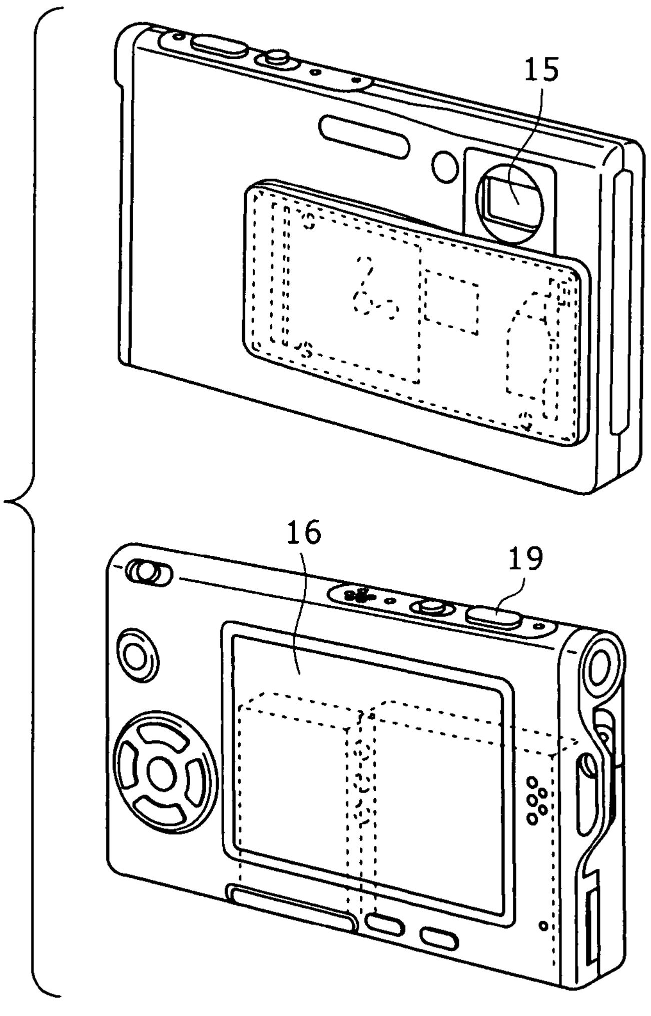
FIG. 12 is perspective views showing a digital still camera which includes the display apparatus of FIG. 1.

FIG. 12 shows a digital camera to which the embodiment of the present invention is applied. Referring to FIG. 12, a front elevational view of the digital camera is shown on the upper side, and a rear elevational view of the digital camera is shown on the lower side. The digital camera shown includes an image pickup lens, a flash light emitting section 15, a display section 16, a control switch, a menu switch, a shutter 19 and so forth. The digital camera is produced using the display apparatus of the embodiment as the display section 16.

Figure 13:
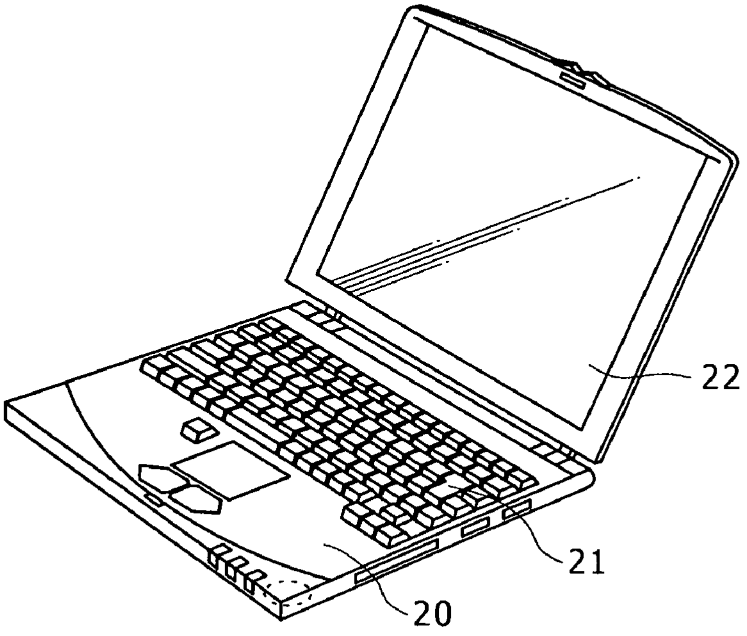
FIG. 13 is a perspective view showing a notebook type personal computer which includes the display apparatus of FIG. 1.

FIG. 13 shows a notebook type personal computer to which the embodiment of the present invention is applied. Referring to FIG. 13, the notebook type personal computer shown includes a body 20, a keyboard 21 for being operated in order to input characters and so forth, a display section 22 provided on a body cover for displaying an image and so forth. The notebook type personal computer is produced using the display apparatus of the embodiment as the display section 22.

Figure 14:
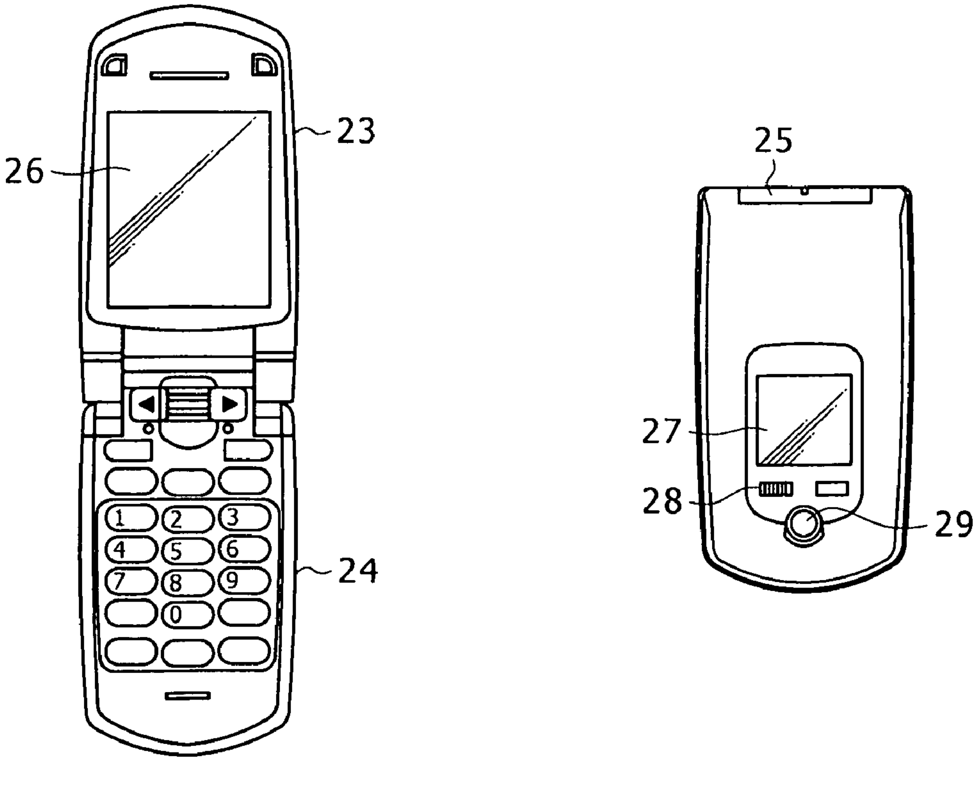
FIG. 14 is a schematic view showing a portable terminal apparatus which includes the display apparatus of FIG. 1.

FIG. 14 shows a portable terminal apparatus to which the embodiment of the present invention is applied. Referring to FIG. 14, the portable terminal apparatus is shown in an unfolded state on the left side and shown in a folded state on the right side. The portable terminal apparatus includes an upper side housing 23, a lower side housing 24, a connection section 25 in the form of a hinge section, a display section 26, a sub display section 27, a picture light 28, a camera 29 and so forth. The portable terminal apparatus is produced using the display apparatus of the embodiment as the sub display section 27.

Figure 15:
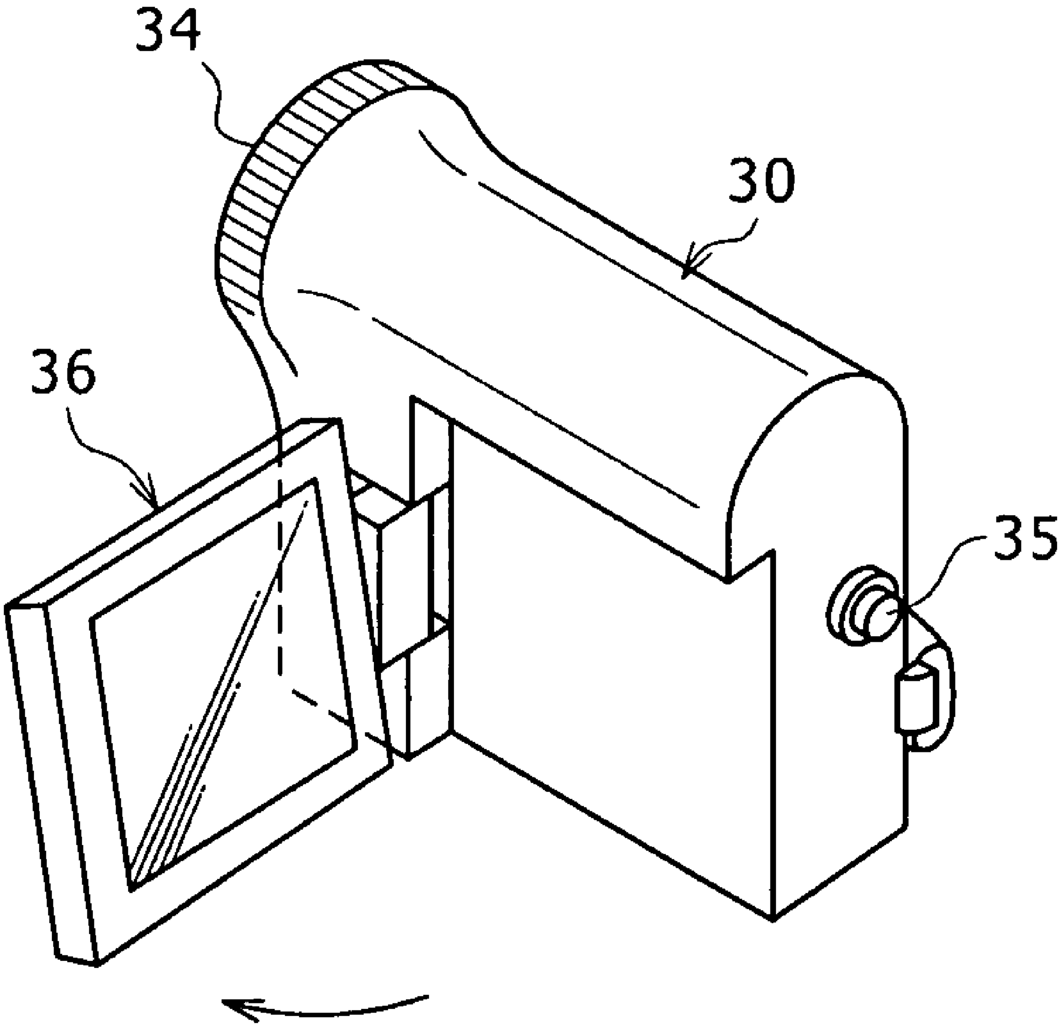
FIG. 15 is a perspective view showing a video camera which includes the display apparatus of FIG. 1.
Figure 16:
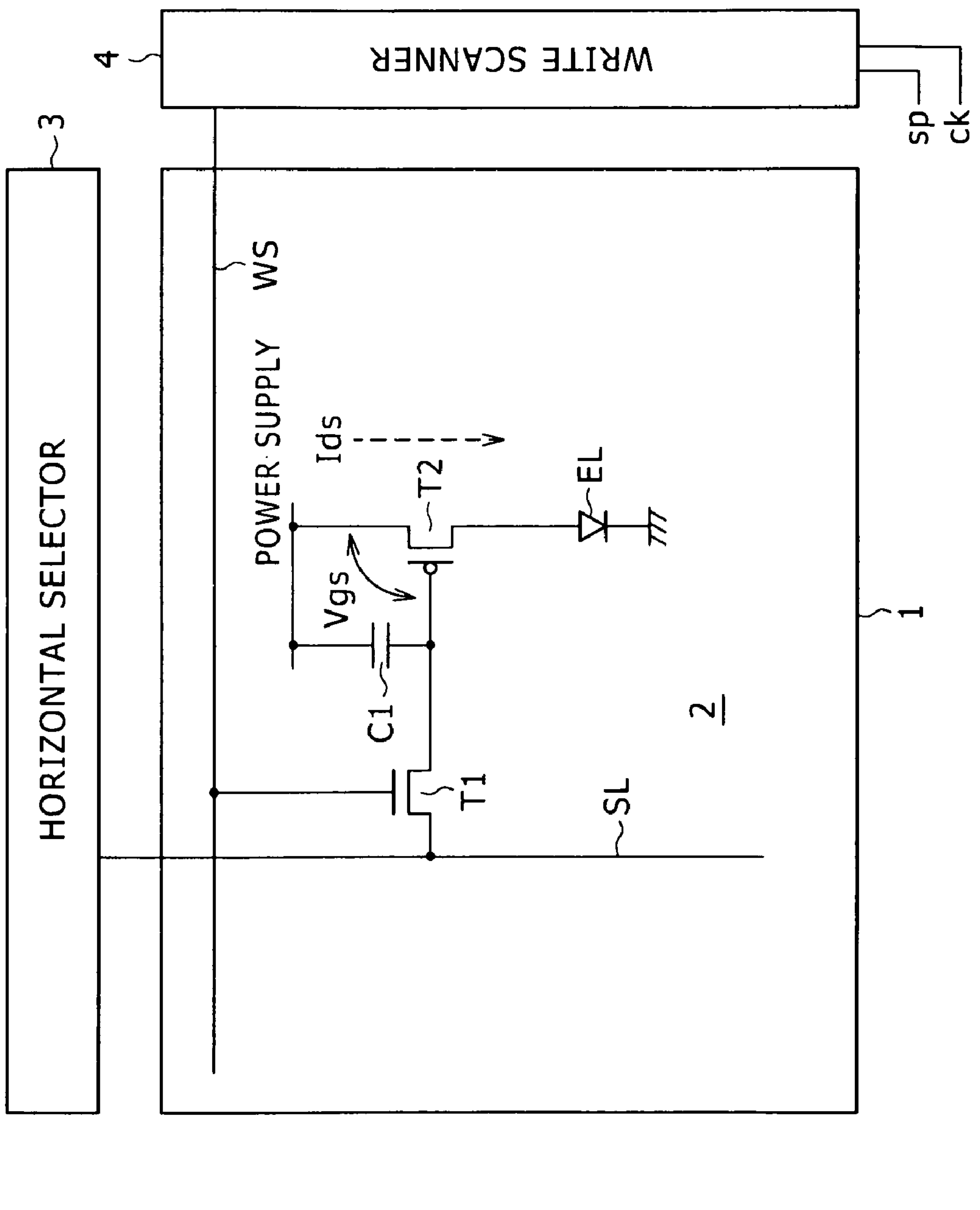
FIG. 16 is a circuit diagram showing an example of an existing display apparatus.
Figure 17:
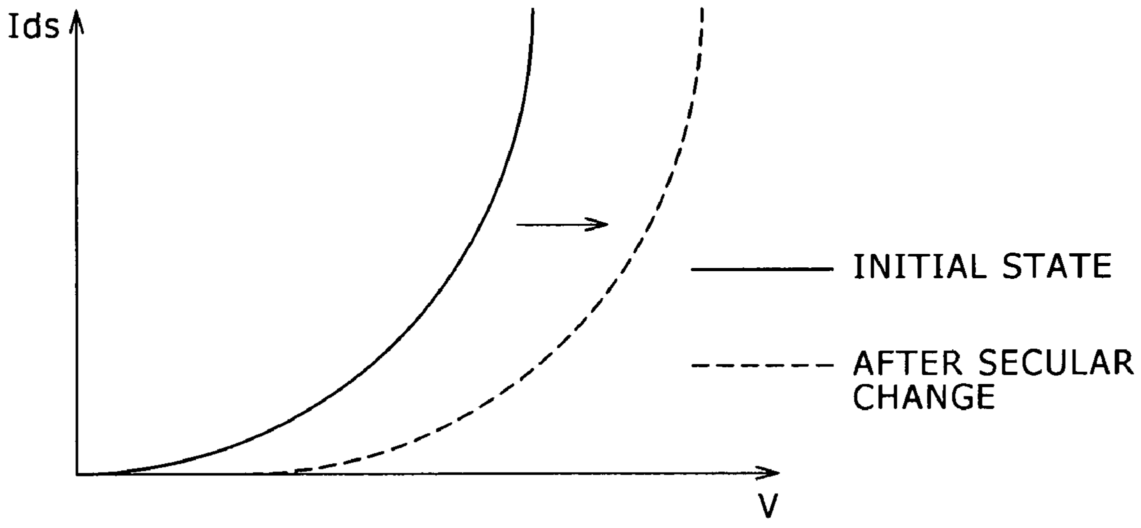
FIG. 17 is a graph illustrating a problem of the existing display apparatus.
Figure 18:
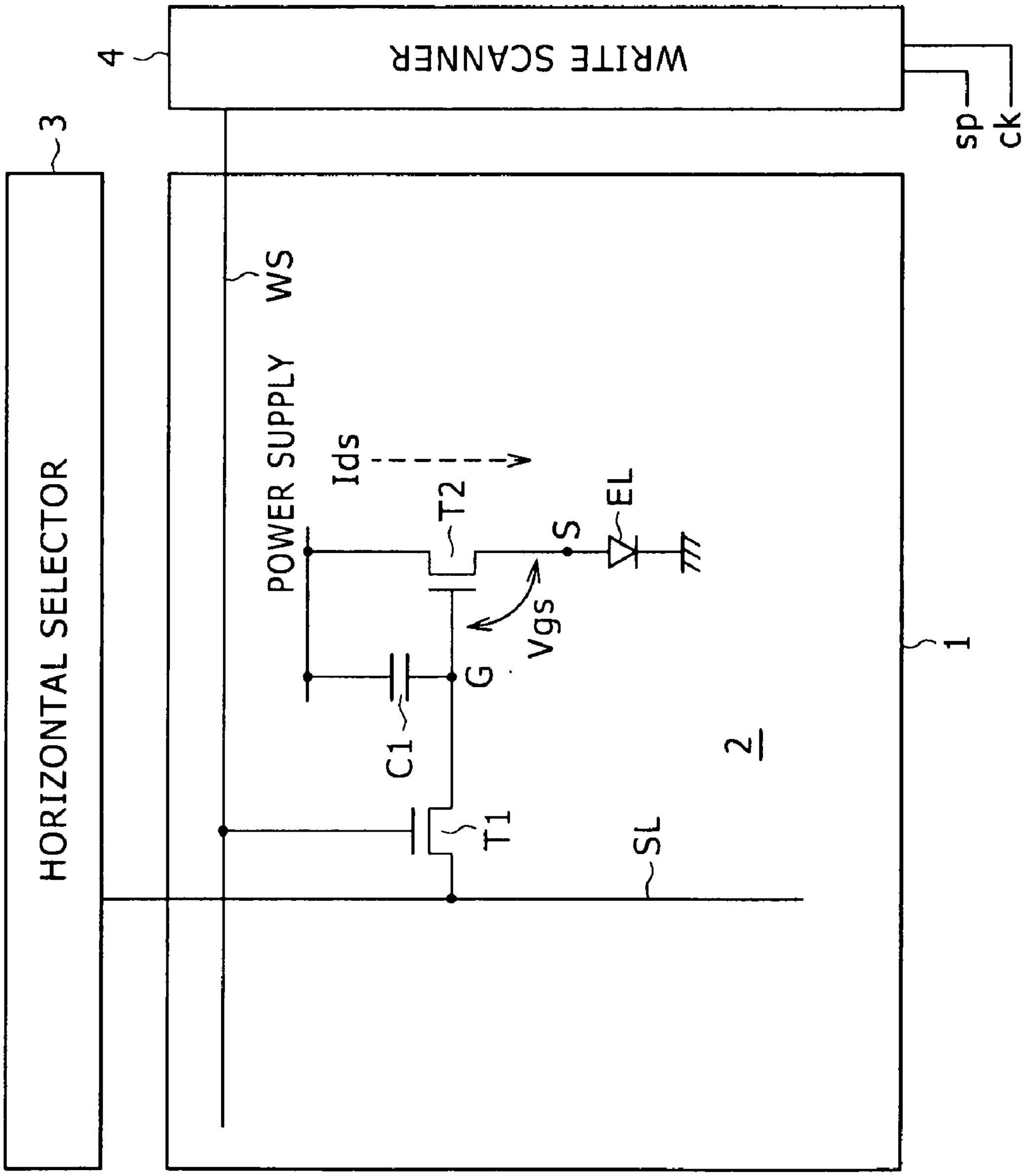
FIG. 18 is a circuit diagram showing another example of an existing display apparatus.

FIG. 15 shows a video camera to which the embodiment of the present invention is applied. Referring to FIG. 15, the video camera shown includes a body section 30, and a lens 34 for picking up an image of an image pickup object, a start/stop switch 35 for image pickup, a monitor 36 and so forth provided on a face of the body section 30 which is directed forwardly. The video camera is produced using the display apparatus of the embodiment as the monitor 36.

While a preferred embodiment of the present invention has been described using specific terms, such description is for illustrative purposes only, and it is to be understood that changes and variations may be made without departing from the spirit or scope of the following claims.

What is claimed is:

1. A display apparatus, comprising:

a pixel array section; and a driving section;

the pixel array section including a plurality of scanning lines disposed along the direction of a row, a plurality of signal lines disposed along the direction of a column, a plurality of pixels disposed in rows and columns at places at which the scanning lines and the signal lines intersect with each other, and a plurality of feed lines disposed in parallel to the scanning lines;

the driving section including a scanner for successively supplying a control signal to the scanning lines with a phase difference of a horizontal period, a selector for supplying an image signal having a signal potential, which changes over between a reference potential and a signal potential within each horizontal period, to the signal lines, and a power supply for supplying a power supply voltage, which changes over between a high potential and a low potential within each horizontal period, commonly to the feed lines;

each of the pixels including a sampling transistor connected at one of a pair of current terminals thereof to an associated one of the signal lines and at a control terminal thereof to an associated one of the scanning lines, a driving transistor connected at one of a pair of current terminals thereof, which serves as a drain side, to an associated one of the feed lines and at a control terminal thereof, which serves as a gate, to the other one of the current terminals of the sampling transistor, a light emitting element connected to that one of the current terminals of the driving transistor which serves as a source side, and a storage capacitor connected between the source and the gate of the driving transistor;

the sampling transistor being turned on, when the associated feed line has the low potential and the associated signal line has the reference potential, in response to the control signal to carry out a preparation operation of setting the gate of the driving transistor to the reference potential and setting the source of the driving transistor to the low potential;

the sampling transistor carrying out a correction operation of writing a threshold voltage of the driving transistor into the storage capacitor connected between the gate and the source of the driving transistor within a period after the potential of the associated feed line changes over from the low potential to the high potential after the preparation operation is carried out until the sampling transistor is turned off in response to the control signal;

the sampling transistor being turned on in response to the control signal when the associated feed line has the high potential and the associated signal line has the signal potential to write the signal potential into the storage capacitor;

the driving transistor supplying driving current corresponding to the signal potential written in the storage capacitor to the light emitting element to carry out a light emitting operation.

2. The display apparatus according to claim 1, wherein the selector changes over the image signal among three levels including a stop potential lower than the reference potential in addition to the reference potential and the signal potential within each horizontal period, and the sampling transistor repetitively carries out the correction operation time-divisionally and separately within a plurality of horizontal periods and applies, in each of the correction operations, the stop potential to the gate of the driving transistor after the application of the reference potential to stop the correction operation.

3. The display apparatus according to claim 2, wherein the stop potential is different from the low potential by a voltage lower than the threshold voltage of the driving transistor.

4. The display apparatus according to claim 2, wherein the sampling transistor applies, after the preparation operation, the stop potential to the gate of the driving potential to turn off the driving transistor.

5. The display apparatus according to claim 1, wherein the scanner turns off, after the writing operation, the sampling transistor to start the light emitting operation and then turns on the sampling transistor to write a predetermined potential from the associated signal line to the gate of the driving transistor to stop the emission of light of the light emitting element.

6. The display apparatus according to claim 5, wherein the light emitting element is connected at the anode thereof to the source of the driving transistor and at the cathode thereof to a predetermined cathode potential, and the predetermined potential is lower than the sum of the threshold voltage of the light emitting element and the threshold voltage of the driving transistor to the cathode potential.

7. The display apparatus according to claim 6, wherein the selector supplies the reference potential as the predetermined potential to the signal lines.

8. An electronic apparatus, comprising a display apparatus, including:

a pixel array section; and a driving section;

the pixel array section including a plurality of scanning lines disposed along the direction of a row, a plurality of signal lines disposed along the direction of a column, a plurality of pixels disposed in rows and columns at places at which the scanning lines and the signal lines intersect with each other, and a plurality of feed lines disposed in parallel to the scanning lines;

the driving section including a scanner for successively supplying a control signal to the scanning lines with a phase difference of a horizontal period, a selector for supplying an image signal having a signal potential, which changes over between a reference potential and a signal potential within each horizontal period, to the signal lines, and a power supply for supplying a power supply voltage, which changes over between a high potential and a low potential within each horizontal period, commonly to the feed lines;

each of the pixels including a sampling transistor connected at one of a pair of current terminals thereof to an associated one of the signal lines and at a control terminal thereof to an associated one of the scanning lines, a driving transistor connected at one of a pair of current terminals thereof, which serves as a drain side, to an associated one of the feed lines and at a control terminal thereof, which serves as a gate, to the other one of the current terminals of the sampling transistor, a light emitting element connected to that one of the current terminals of the driving transistor which serves as a source side, and a storage capacitor connected between the source and the gate of the driving transistor;

the sampling transistor being turned on, when the associated feed line has the low potential and the associated signal line has the reference potential, in response to the control signal to carry out a preparation operation of setting the gate of the driving transistor to the reference potential and setting the source of the driving transistor to the low potential;

the sampling transistor carrying out a correction operation of writing a threshold voltage of the driving transistor into the storage capacitor connected between the gate and the source of the driving transistor within a period after the potential of the associated feed line changes over from the low potential to the high potential after the preparation operation is carried out until the sampling transistor is turned off in response to the control signal;

the sampling transistor being turned on in response to the control signal when the associated feed line has the high potential and the associated signal line has the signal potential to write the signal potential into the storage capacitor;

the driving transistor supplying driving current corresponding to the signal potential written in the storage capacitor to the light emitting element to carry out a light emitting operation.

9. A driving method for a display apparatus which includes a pixel array section and a driving section, the pixel array section including a plurality of scanning lines disposed along the direction of a row, a plurality of signal lines disposed along the direction of a column, a plurality of pixels disposed in rows and columns at places at which the scanning lines and the signal lines intersect with each other, and a plurality of feed lines disposed in parallel to the scanning lines, the driving section including a scanner for successively supplying a control signal to the scanning lines with a phase difference of a horizontal period, a selector for supplying an image signal having a signal potential, which changes over between a reference potential and a signal potential within each horizontal period, to the signal lines, and a power supply for supplying a power supply voltage, which changes over between a high potential and a low potential within each horizontal period, commonly to the feed lines, each of the pixels including a sampling transistor connected at one of a pair of current terminals thereof to an associated one of the signal lines and at a control terminal thereof to an associated one of the scanning lines, a driving transistor connected at one of a pair of current terminals thereof, which serves as a drain side, to an associated one of the feed lines and at a control terminal thereof, which serves as a gate, to the other one of the current terminals of the sampling transistor, a light emitting element connected to that one of the current terminals of the driving transistor which serves as a source side, and a storage capacitor connected between the source and the gate of the driving transistor, the driving method comprising the steps of:

turning on the sampling transistor, when the associated feed line has the low potential and the associated signal line has the reference potential, in response to the control signal to carry out a preparation operation of setting the gate of the driving transistor to the reference potential and setting the source of the driving transistor to the low potential;

carrying out, by the sampling transistor, a correction operation of writing a threshold voltage of the driving transistor into the storage capacitor connected between the gate and the source of the driving transistor within a period after the potential of the associated feed line changes over from the low potential to the high potential after the preparation operation is carried out until the sampling transistor is turned off in response to the control signal;

turning on the sampling transistor in response to the control signal when the associated feed line has the high potential and the associated signal line has the signal potential to write the signal potential into the storage capacitor; and supplying, by the driving transistor, driving current corresponding to the signal potential written in the storage capacitor to the light emitting element to carry out a light emitting operation.

10. The electronic apparatus according to claim 8, wherein the selector changes over the image signal among three levels including a stop potential lower than the reference potential in addition to the reference potential and the signal potential within each horizontal period, and the sampling transistor repetitively carries out the correction operation time-divisionally and separately within a plurality of horizontal periods and applies, in each of the correction operations, the stop potential to the gate of the driving transistor after the application of the reference potential to stop the correction operation.

11. The electronic apparatus according to claim 10, wherein the stop potential is different from the low potential by a voltage lower than the threshold voltage of the driving transistor.

12. The electronic apparatus according to claim 10, wherein the sampling transistor applies, after the preparation operation, the stop potential to the gate of the driving potential to turn off the driving transistor.

13. The electronic apparatus according to claim 8, wherein the scanner turns off, after the writing operation, the sampling transistor to start the light emitting operation and then turns on the sampling transistor to write a predetermined potential from the associated signal line to the gate of the driving transistor to stop the emission of light of the light emitting element.

14. The electronic apparatus according to claim 13, wherein the light emitting element is connected at the anode thereof to the source of the driving transistor and at the cathode thereof to a predetermined cathode potential, and the predetermined potential is lower than the sum of the threshold voltage of the light emitting element and the threshold voltage of the driving transistor to the cathode potential.

15. The method according to claim 9, wherein the selector changes over the image signal among three levels including a stop potential lower than the reference potential in addition to the reference potential and the signal potential within each horizontal period, and the sampling transistor repetitively carries out the correction operation time-divisionally and separately within a plurality of horizontal periods and applies, in each of the correction operations, the stop potential to the gate of the driving transistor after the application of the reference potential to stop the correction operation.

16. The method according to claim 15, wherein the stop potential is different from the low potential by a voltage lower than the threshold voltage of the driving transistor.

17. The method according to claim 15, wherein the sampling transistor applies, after the preparation operation, the stop potential to the gate of the driving potential to turn off the driving transistor.

18. The method according to claim 9, wherein the scanner turns off, after the writing operation, the sampling transistor to start the light emitting operation and then turns on the sampling transistor to write a predetermined potential from the associated signal line to the gate of the driving transistor to stop the emission of light of the light emitting element.

19. The method according to claim 18, wherein the light emitting element is connected at the anode thereof to the source of the driving transistor and at the cathode thereof to a predetermined cathode potential, and the predetermined potential is lower than the sum of the threshold voltage of the light emitting element and the threshold voltage of the driving transistor to the cathode potential.

* * * * *